US012731177B2

(12) United States Patent
Barton et al.

(10) Patent No.: US 12,731,177 B2
(45) Date of Patent: Sep. 8, 2026

(54) METHOD AND SYSTEM FOR MANAGING SHIPMENT INFORMATION

(71) Applicant: Freightview, Inc., Overland Park, KS (US)

(72) Inventors: Tim A. Barton, Leawood, KS (US); Jason Alexander Roberts, Belton, MO (US)

(73) Assignee: Freightview, Inc., Overland Park, KS (US)

( * ) Notice: Subject to any disclaimer, the term of this patent is extended or adjusted under 35 U.S.C. 154(b) by 557 days.

(21) Appl. No.: 17/404,095

(22) Filed: Aug. 17, 2021

(65) Prior Publication Data

US 2021/0374817 A1 Dec. 2, 2021

Related U.S. Application Data

(63) Continuation of application No. 14/243,300, filed on Apr. 2, 2014, now Pat. No. 11,100,549.

(Continued)

(51) Int. Cl.
*G06Q 30/0601* (2023.01)
*G06Q 10/083* (2024.01)

(Continued)

(52) U.S. Cl.
CPC ....... *G06Q 30/0611* (2013.01); *G06Q 10/083* (2013.01); *G06Q 10/0834* (2013.01); *G06Q 10/0835* (2013.01)

(58) Field of Classification Search
CPC ............. G06Q 10/083; G06Q 10/0835; G06Q 10/0834; G06Q 30/0611; G06Q 30/0601
See application file for complete search history.

(56) References Cited

U.S. PATENT DOCUMENTS

2006/0109964 A1* 5/2006 Skelton .................. G06Q 30/08 379/114.02
2006/0111986 A1* 5/2006 Yorke .................... G06Q 30/06 705/26.1

(Continued)

OTHER PUBLICATIONS

HDT Magazine Staff, "TransCore Improves Driverlink Driver Employment Site," Heavy Duty Trucking, Apr. 17, 2005, Retrieved from https://www.truckinginfo.com/news/transcore-improves-driverlink-driver-employment-site (Year: 2005).*

*Primary Examiner* — Bryan J Kirk
(74) *Attorney, Agent, or Firm* — Erise IP, P.A.

(57) ABSTRACT

A computer program, method, and system for managing shipping transactions provide a graphical user interface that contemporaneously displays a list of shipment requests and one or more interface elements. The shipment requests each display information about a shipment request including a plurality of carriers and associated bid statuses. The interface elements include a create shipment requests interface element that receives a user input. Upon receiving the user input the graphical user interface displays a create shipment request screen that allows a shipper to create multiple shipment requests and send them to at least one carrier. The carrier receives a communication regarding the shipment request and the communication includes a prompt to respond. In response to the prompt a second graphical user interface is displayed to the carrier that allows further communication with the shipper regarding the shipment request.

20 Claims, 21 Drawing Sheets

Related U.S. Application Data

(60) Provisional application No. 61/808,486, filed on Apr. 4, 2013.

(51) Int. Cl.
*G06Q 10/0834* (2023.01)
*G06Q 10/0835* (2023.01)

(56) References Cited

U.S. PATENT DOCUMENTS

2012/0078743 A1* 3/2012 Betancourt ............ G06Q 30/08 705/338
2013/0268331 A1* 10/2013 Bitz ................... G06Q 30/0631 705/26.7
2014/0058896 A1* 2/2014 Jung .................. G06Q 30/0623 705/26.61

* cited by examiner

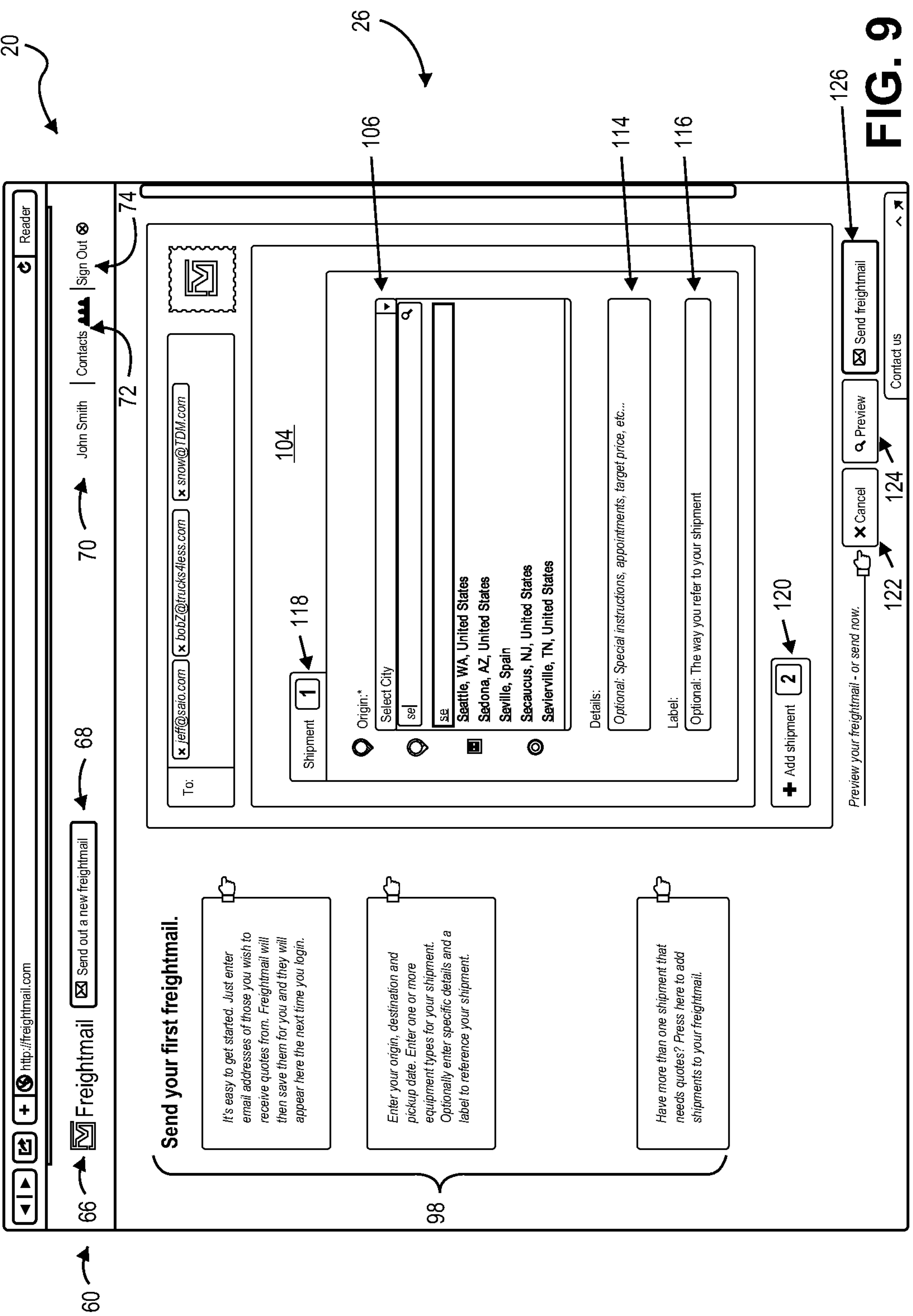
http://freightmail.com
Reader
Freightmail
Send out a new freightmail
John Smith
Contacts
Sign Out
Send your first freightmail.
It's easy to get started. Just enter email addresses of those you wish to receive quotes from. Freightmail will then save them for you and they will appear here the next time you login.
Enter your origin, destination and pickup date. Enter one or more equipment types for your shipment. Optionally enter specific details and a label to reference your shipment.
Have more than one shipment that needs quotes? Press here to add shipments to your freightmail.
To:
jeff@saio.com
bobZ@trucks4less.com
snow@TDM.com
Shipment 1
Origin:*
Select City
se
Seattle, WA, United States
Sedona, AZ, United States
Seville, Spain
Secaucus, NJ, United States
Sevierville, TN, United States
Details:
Optional: Special instructions, appointments, target price, etc...
Label:
Optional: The way you refer to your shipment
Add shipment 2
Preview your freightmail - or send now.
Cancel
Preview
Send freightmail
Contact us
20
26
60
66
68
70
72
74
98
104
106
114
116
118
120
122
124
126
FIG. 9

METHOD AND SYSTEM FOR MANAGING SHIPMENT INFORMATION

RELATED APPLICATION

This application is a continuation of U.S. patent application Ser. No. 14/243,300, filed Apr. 2, 2014, and entitled "METHOD AND SYSTEM FOR MANAGING SHIPMENT INFORMATION," which is a non-provisional patent application claims priority benefit, with regard to all common subject matter, of earlier-filed U.S. Provisional Patent Application No. 61/808,486, filed Apr. 4, 2013, and entitled "COMPUTER PROGRAM, METHOD, AND SYSTEM FOR MANAGING SHIPMENT INFORMATION," the disclosures of which are incorporated by reference in their entirety into the present application.

BACKGROUND

1. Field

Embodiments of the invention relate to a computer program, method, and system for managing shipping transactions. In more detail, embodiments of the invention are directed to a computer program, method, and system for shippers and carriers to create, discuss, negotiate and manage shipping transactions that involve the shipment of items and trucking requests that involve the availability of cargo vehicles to ship items.

2. Related Art

Shipping transactions are classically conducted with a paper and pencil through a telephone or in-person meeting. Currently available shipping management software generally includes complicated and unintuitive interfaces or in some instances a word processor and a spreadsheet program used in an ad hoc fashion. Using such disparate means of managing shipping transactions has multiple negative effects, such that users must expend significant amounts of time managing transactions or sending similar requests for bids multiple times. Further, current property management software has multiple deficiencies such that a user may only view a single bid for each shipping transaction or communicate single shipping transactions serially.

SUMMARY

In accordance with a first embodiment of the invention, a graphical user interface provided by a computer program for managing shipping transactions contemporaneously displays a list of shipment requests and one or more interface elements. Each shipment request in the list displays information regarding the shipment request and a plurality of carriers and a plurality of bid statuses, respectively. The interface elements include a create shipment request interface element that receives user input. Upon receiving user input the graphical user interface displays a create shipment request screen that allows a shipper to create multiple shipment requests and send them to at least one carrier. The carrier receives a communication regarding the shipment request and the communication includes a prompt to respond. In response to the prompt a second graphical user interface is displayed to the carrier that allows further communication with the shipper regarding the shipment request.

In accordance with a second embodiment of the invention, a graphical user interface provided by a computer program for managing shipping transactions contemporaneously displays a list of cargo vehicle requests and one or more interface elements. Each cargo vehicle request in the list displays information regarding the cargo vehicle request and a plurality of shippers and a plurality of bid statuses, respectively. The interface elements include a create cargo vehicle request interface element that receives user input. Upon receiving user input the graphical user interface displays a create shipment request screen that allows a carrier to create multiple cargo vehicle requests and send them to at least one shipper. The shipper receives a communication regarding the cargo vehicle request and the communication includes a prompt to respond. In response to the prompt a second graphical user interface is displayed to the shipper that allows further communication with the carrier regarding the cargo vehicle request.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 9 is a screen capture depicting the graphical user interface of an embodiment of the invention depicting the create shipment request screen;

Figure 1:
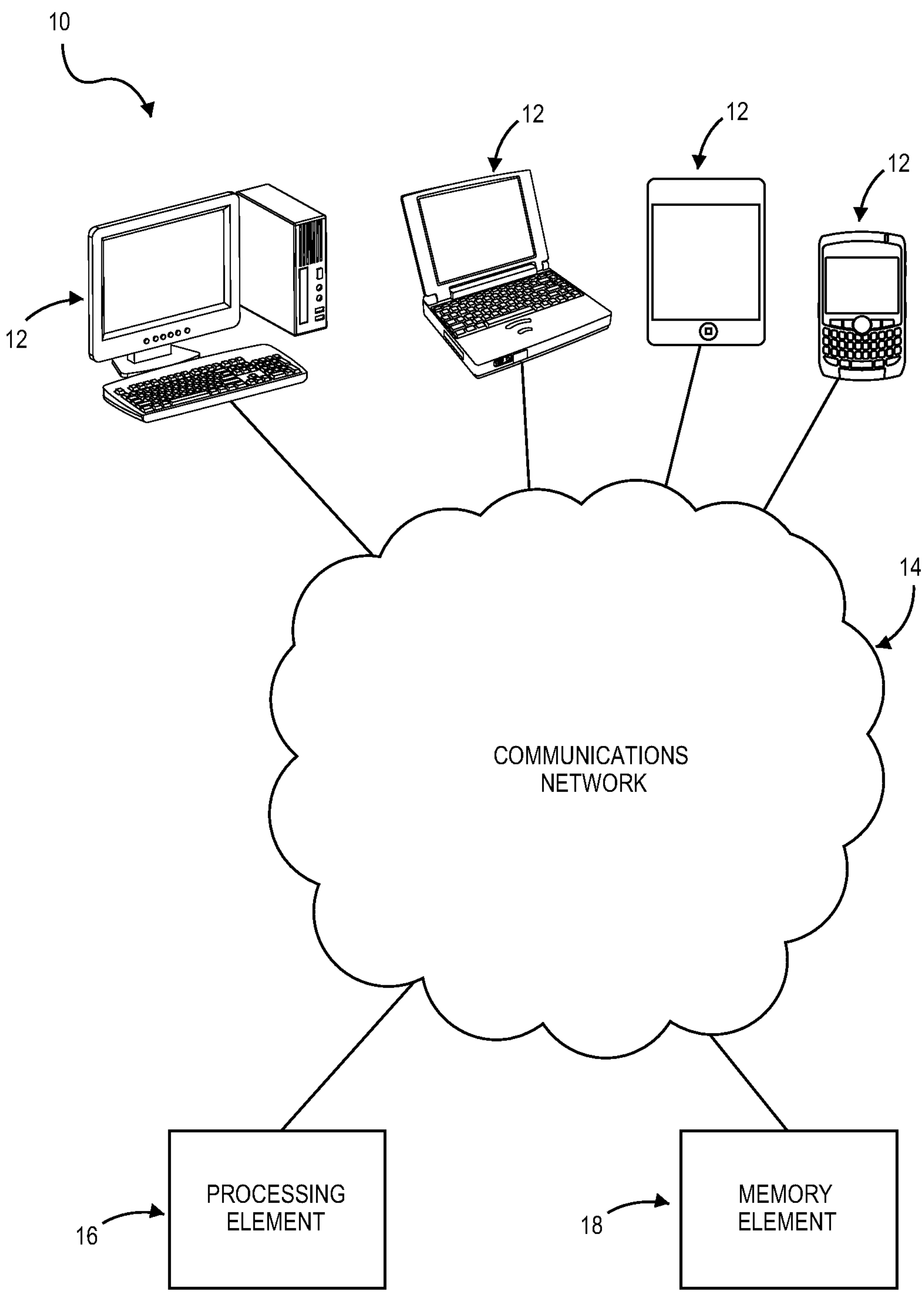
FIG. 1 is a system diagram of an embodiment of the invention depicting various components of the system.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the figures, and particularly FIG. 1, the invention provides various embodiments of a computer program, a method, and a system for managing and coordinating shipments of goods. As used throughout, the term shipper includes any entity that requires a good to be shipped. For example, a shipper may be a widget manufacturer, and the good that needs to be shipped may be a pallet of widgets. The term carrier includes any transportation entity, such as a trucking company, railroad line, airline, a transportation broker, or combinations thereof, which is capable of transporting goods for a shipper via a cargo vehicle. For example, a carrier may be railroad line and the goods that need transported are automobiles from a shipper's automobile factory to a dealership in a differing geographic region. It is appreciated that the invention also provides various embodiments of a computer program, a method, and a system for conducting business transactions. In particular, any business transaction between multiple parties where the parties exchange bids for goods or the performance of services.

The system 10 of embodiments of the invention may comprise computing devices 12 to facilitate the functions and features described herein. The computing devices 12 may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system 10.

The computer program of embodiments of the invention comprises a plurality of code segments executable by a computing device 12 for performing the steps of various methods of the invention. The steps of the method may be performed in the order shown in FIGS. 20-22, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using a shipment management system 10, which broadly comprises server devices, computing devices 12, and a communications network 14.

The computer program of embodiments of the invention may be responsive to user input. As defined herein user input may be received from a variety of computing devices 12 including but not limited to the following: desktops, laptops, calculators, telephones, smartphones, or tablets. The computing devices 12 may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices 12 may include any device, component, or equipment with a processing element 16 and associated memory elements 18. The processing element 16 may implement operating systems, and may be capable of executing the computer program, which is also generally known as instructions, commands, software code, executables, applications ("apps"), and the like. The processing element 16 may include processors, microprocessors, microcontrollers, field programmable gate arrays, and the like, or combinations thereof. The memory elements 18 may be capable of storing or retaining the computer program and may also store data, typically binary data, including text, databases, graphics, audio, video, combinations thereof, and the like. The memory elements 18 may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements 18, the server devices may further include file stores comprising a plurality of hard disk drives, network attached storage, or a separate storage network.

The computing devices 12 may specifically include mobile communication devices (including wireless devices), work stations, desktop computers, laptop computers, palm-top computers, tablet computers, portable digital assistants (PDA), smart phones, and the like, or combinations thereof. Various embodiments of the computing device 12 may also include voice communication devices, such as cell phones and/or smart phones. In preferred embodiments, the computing device 12 will have an electronic display operable to display visual graphics, images, text, etc. In certain embodiments, the computer program facilitates interaction and communication through a graphical user interface (GUI) 20 that is displayed via the electronic display. The GUI 20 enables the user to interact with the electronic display by touching or pointing at display areas to provide information to the system 10.

The communications network 14 may be wired or wireless and may include servers, routers, switches, wireless receivers and transmitters, and the like, as well as electrically conductive cables or optical cables. The communications network 14 may also include local, metro, or wide area networks, as well as the Internet, or other cloud networks. Furthermore, the communications network 14 may include cellular or mobile phone networks, as well as landline phone networks, public switched telephone networks, fiber optic networks, or the like.

The computer program may run on computing devices 12 or, alternatively, may run on one or more server devices. In certain embodiments of the invention, the computer program may be embodied in a stand-alone computer program (i.e., an "app") downloaded on a user's computing device 12 or in a web-accessible program that is accessible by the user's computing device 12 via the communications network 14. As used herein, the stand-along computer program or web-accessible program provides users with access to an electronic resource from which the users can interact with various embodiments of the invention.

In embodiments of the invention users may be provided with different types of accounts. Each type of user account may provide their respective users with unique roles, capabilities, and permissions with respect to implementing embodiments of the invention. For instance, a shipper may be provided with a shipper account that permits the shipper to access embodiments of the invention that are applicable to the shipper managing the shipment of the shipper's goods. Additionally, a carrier may be provided with a carrier account that permits the carrier to access embodiments of the invention that is applicable to managing the various requests for quotes received by shippers and those shipments that the carrier was selected to transport. In addition, any number and/or any specific types of account are provided as may be necessary to carry out the functions, features, and/or implementations of the invention. Upon a shipper and/or a carrier logging in to the electronic resource for a first time, the shipper and/or carrier may be required to provide various pieces of identification information to create their respective accounts. Such identification information may include, for instance, personal name, business name, email address, phone number, or the like. Upon providing the identification information, the shipper and/or carrier may be required to enter (or may be given) a username and password, which will be required to access the electronic resource.

Figure 2:
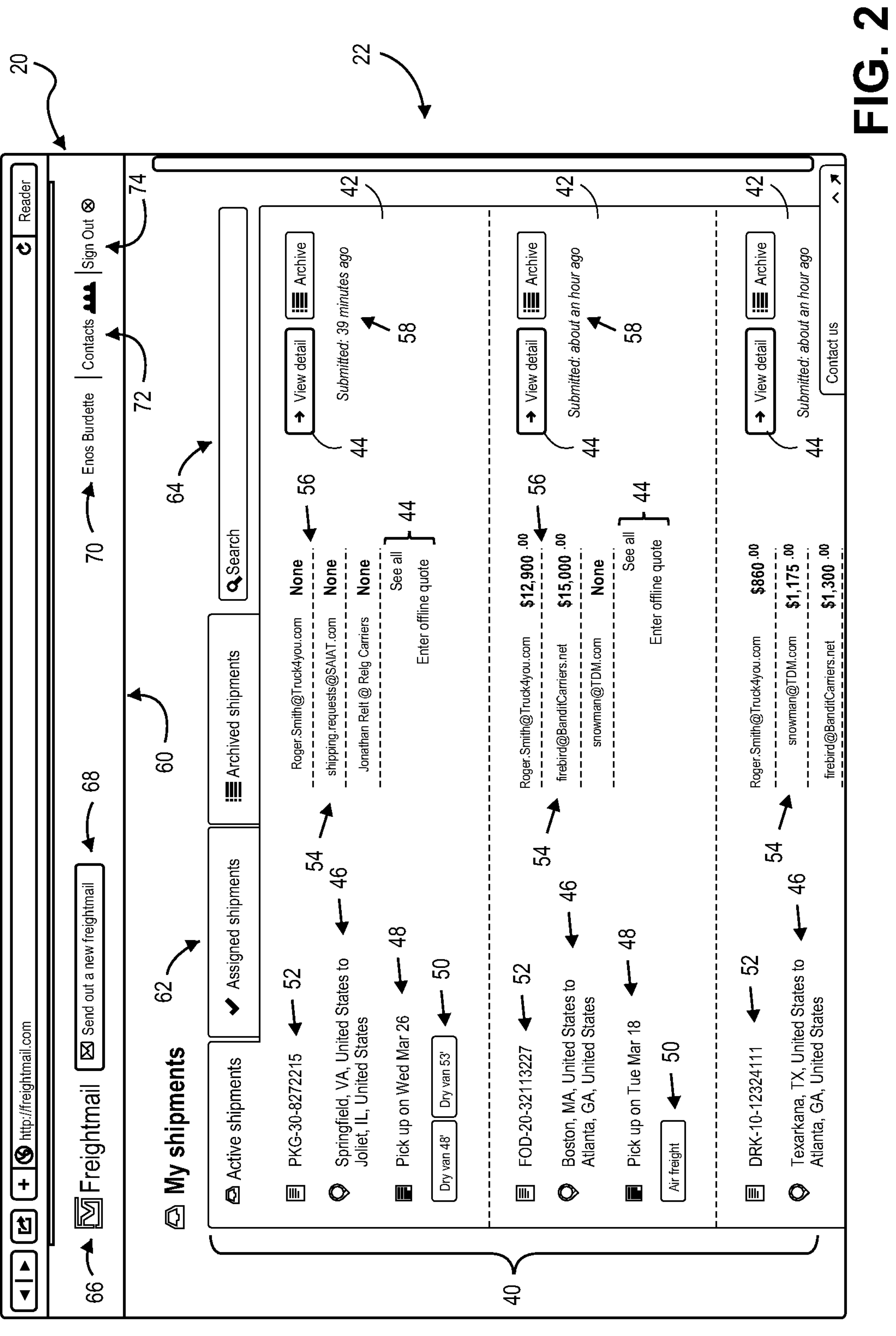
FIG. 2 is a screen capture depicting the graphical user interface of an embodiment of the invention displaying the shipment request list screen.
Figure 3:
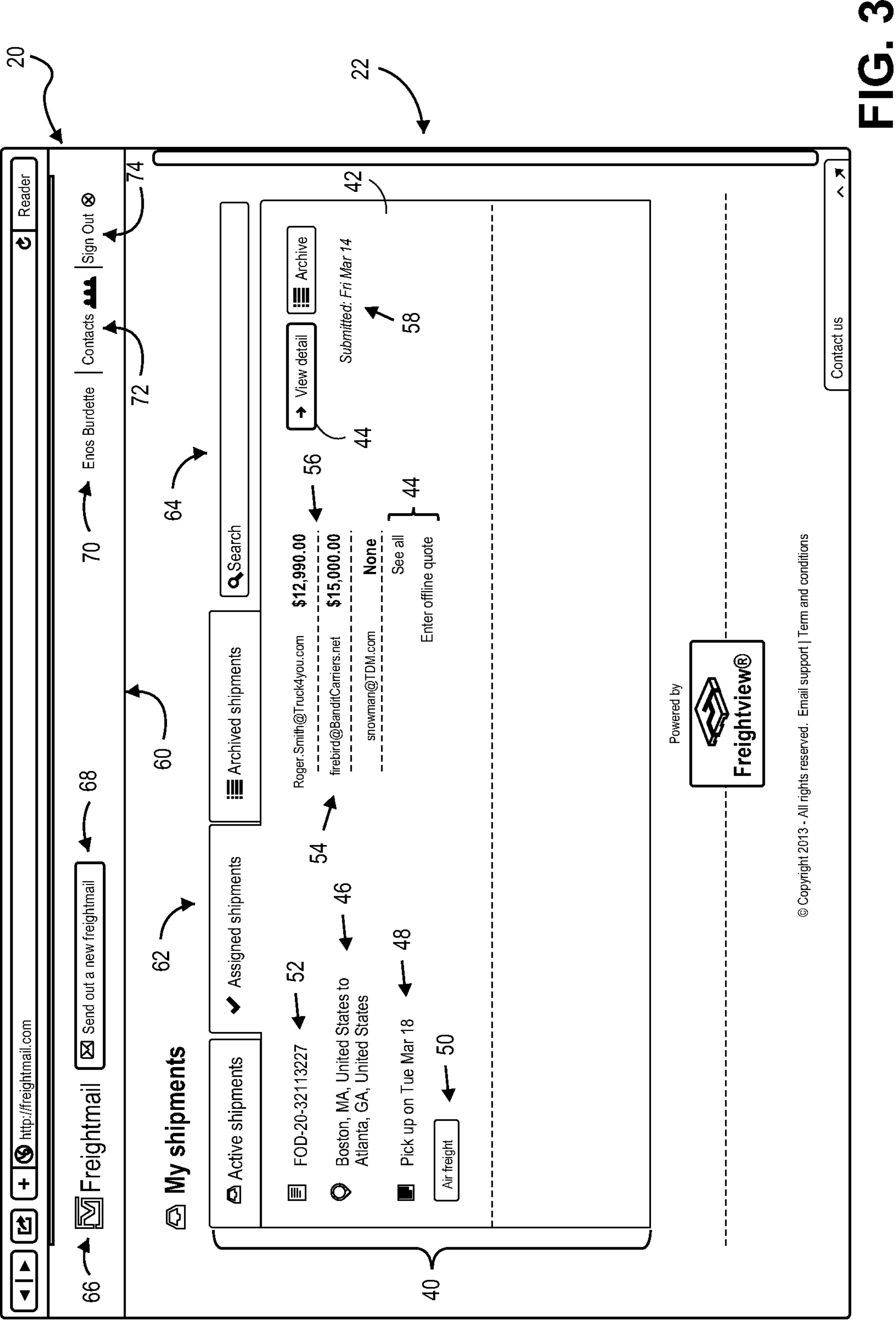
FIG. 3 is a screen capture depicting the graphical user interface of an embodiment of the invention displaying the shipment request list screen.
Figure 4:
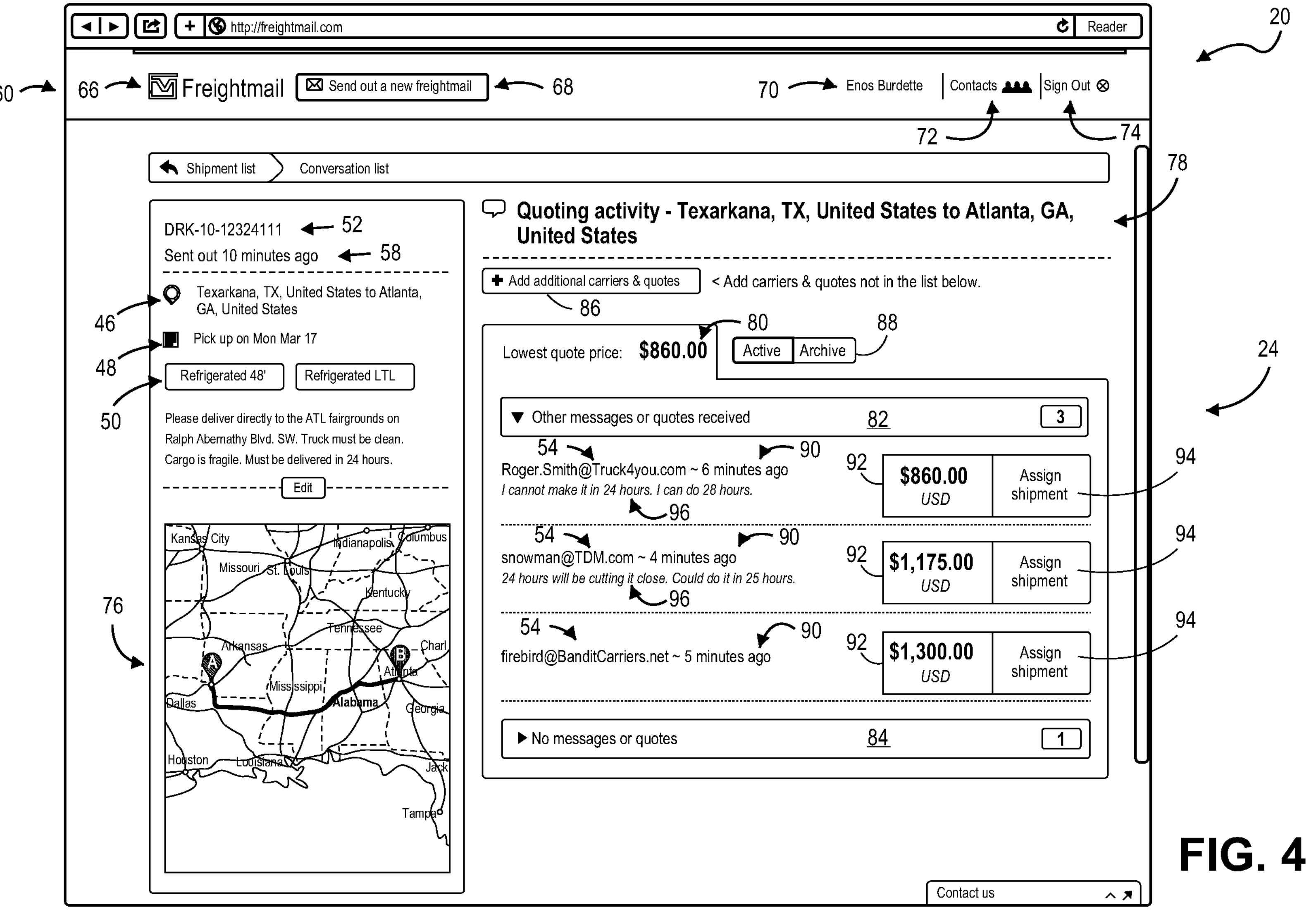
FIG. 4 is a screen capture depicting the graphical user interface of an embodiment of the invention displaying the shipment request detail screen.
Figure 5:
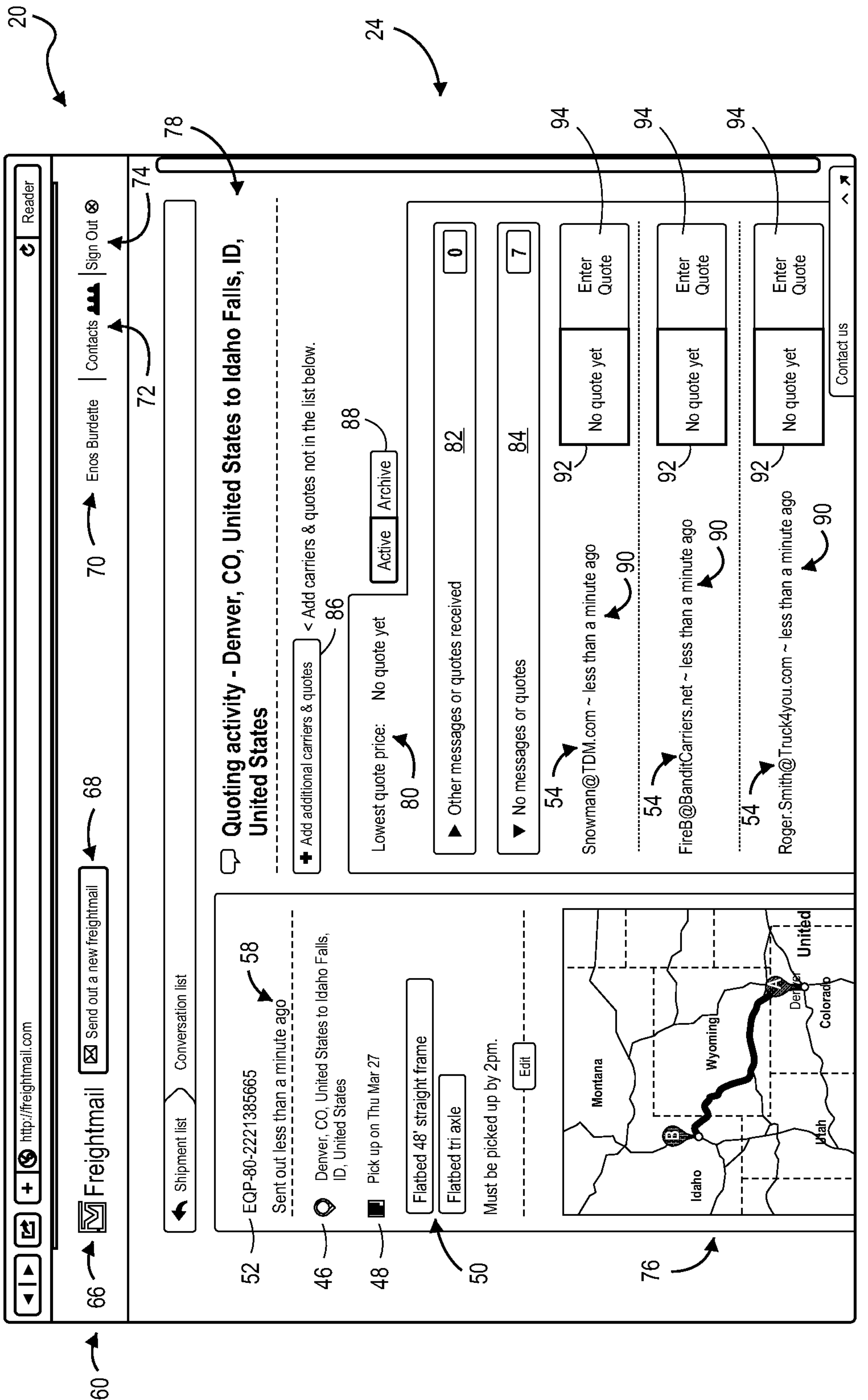
FIG. 5 is a screen capture depicting the graphical user interface of an embodiment of the invention displaying the shipment request detail screen.
Figure 6:
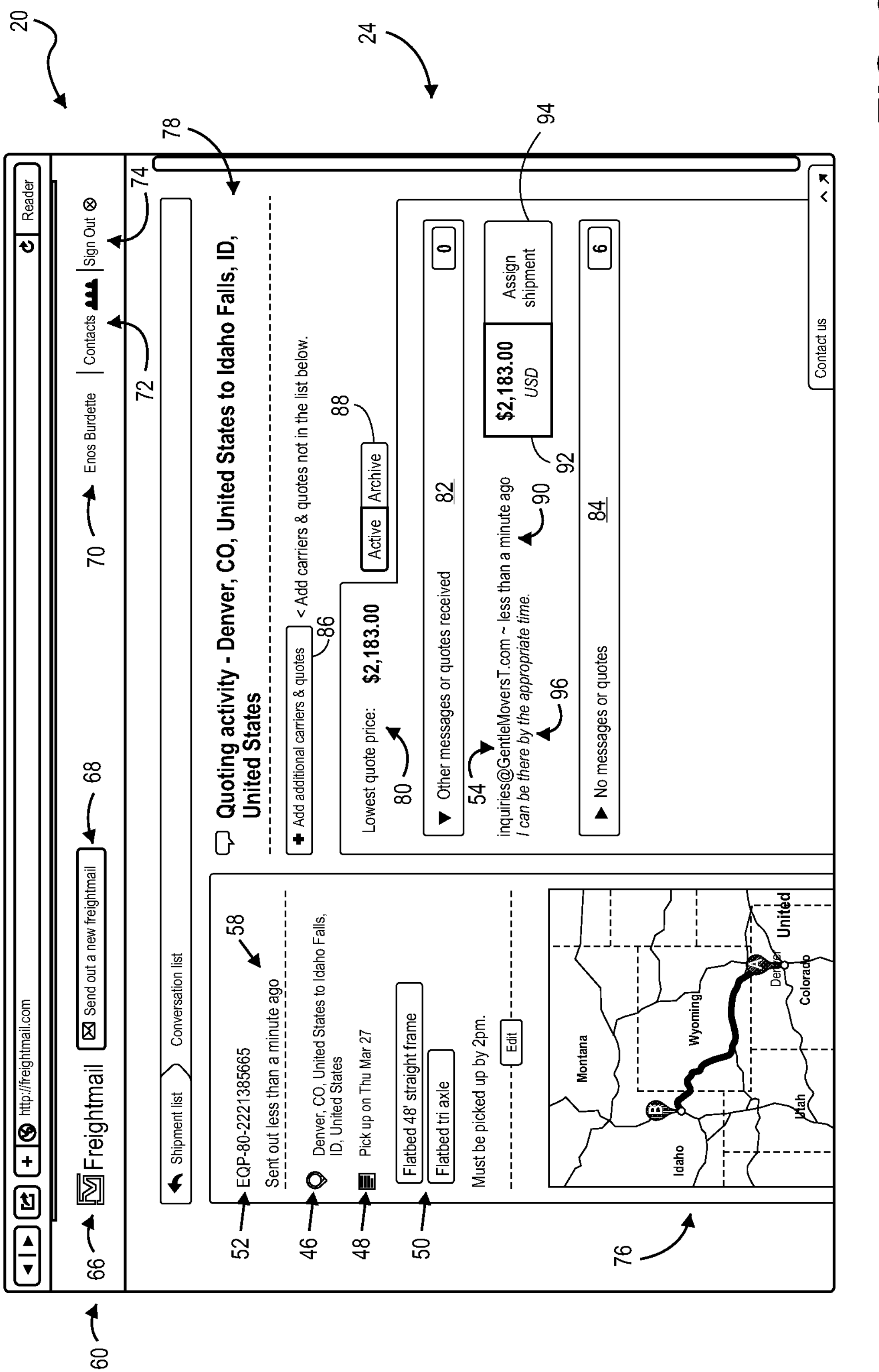
FIG. 6 is a screen capture depicting the graphical user interface of an embodiment of the invention displaying the shipment request detail screen.
Figure 7:
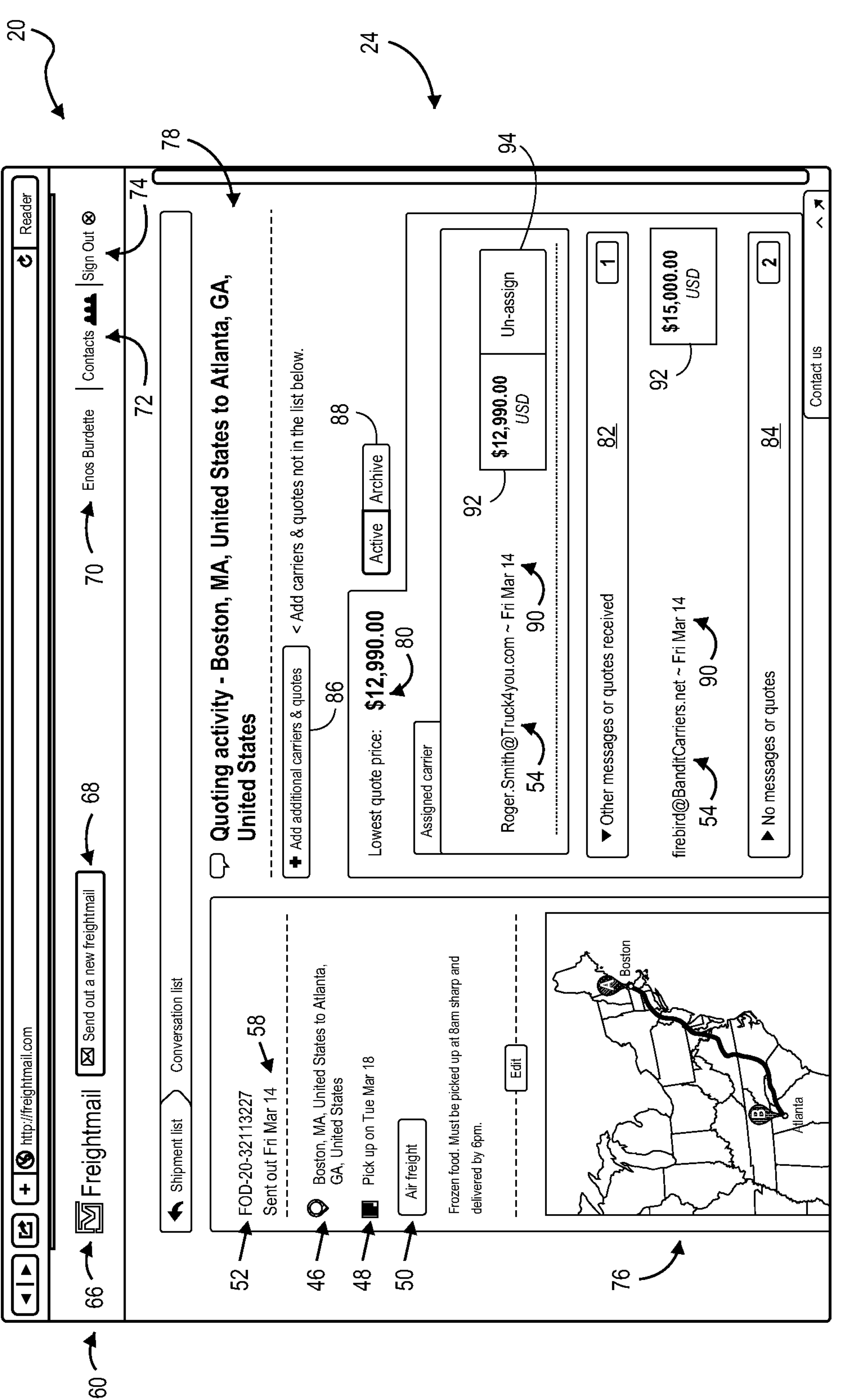
FIG. 7 is a screen capture depicting the graphical user interface of an embodiment of the invention displaying the shipment request detail screen.

The computer program of embodiments of the invention presents to a shipper a graphical user interface (GUI) 20 that displays a variety of information related to shipment requests in an intuitive and easy-to-use manner is show in FIGS. 2-10. The information is provided via the GUI 20 in a format that allows the shipper to quickly manage multiple transactions and determine optimal choices related to bids from carriers. As shown in FIGS. 2 and 3, the GUI 20 displays a shipment request list screen 22 that contemporaneously displays a list of shipment requests created by the shipper, and one or more interface elements to receive user input. In other embodiments, the GUI 20 displays a shipment request detail screen 24 in response to the user input. The shipment request detail screen 24 provides the shipper tools to negotiate and accept bids received by various carriers regarding a single shipment request. In yet other embodiment of the invention, the GUI 20 displays a create shipment request screen 26 that allows the shipper to create multiple shipment requests to one or more carriers. Once the new shipment requests are dispatched to each of the carriers, each carrier is presented with a carrier response list screen 28 on a second GUI 30 for management of the shipment requests received from the shipper and other shipment requests from other shippers.

Figure 13:
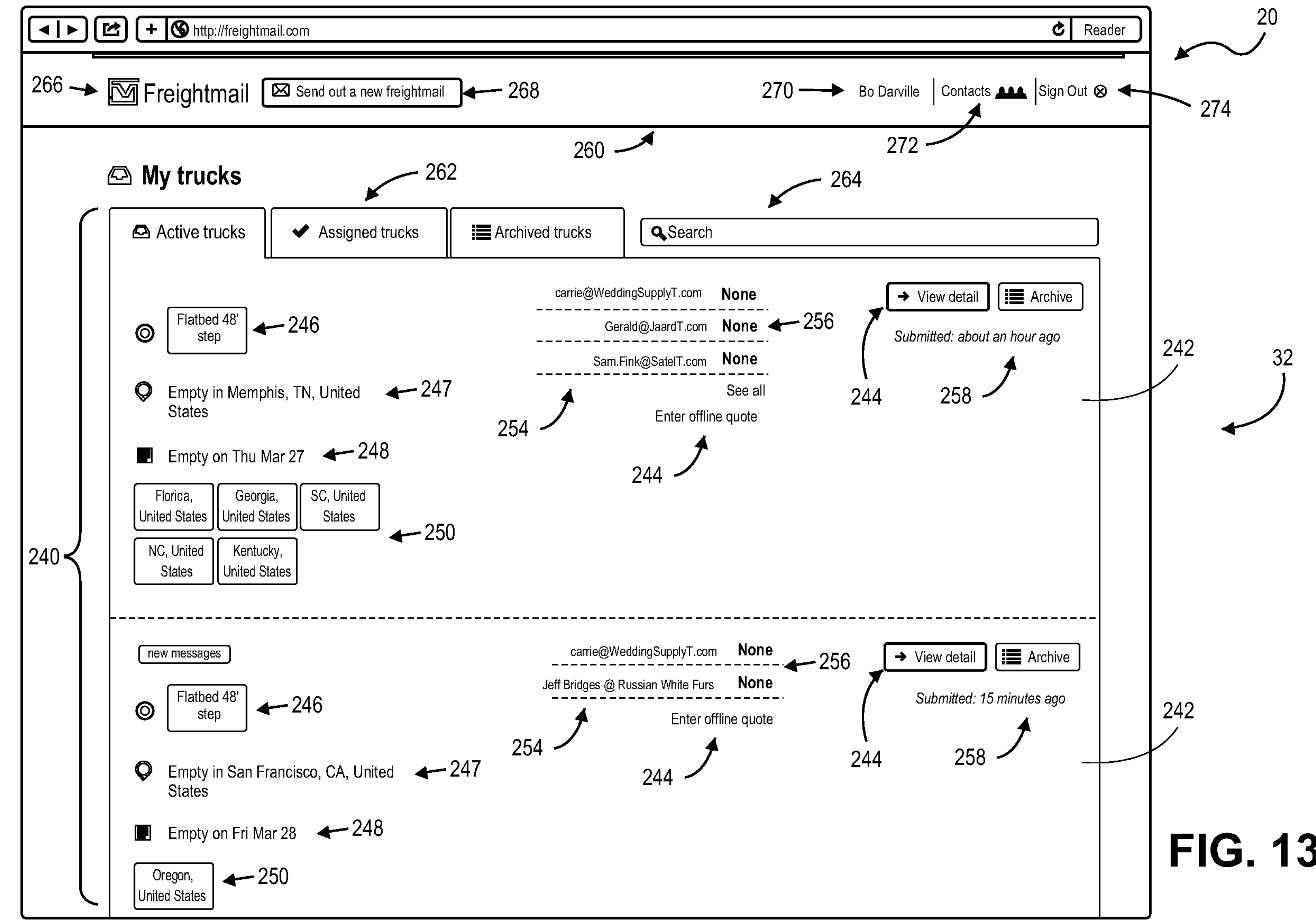
FIG. 13 is a screen capture depicting the graphical user interface of an embodiment of the invention depicting the cargo vehicle request list screen.
Figure 14:
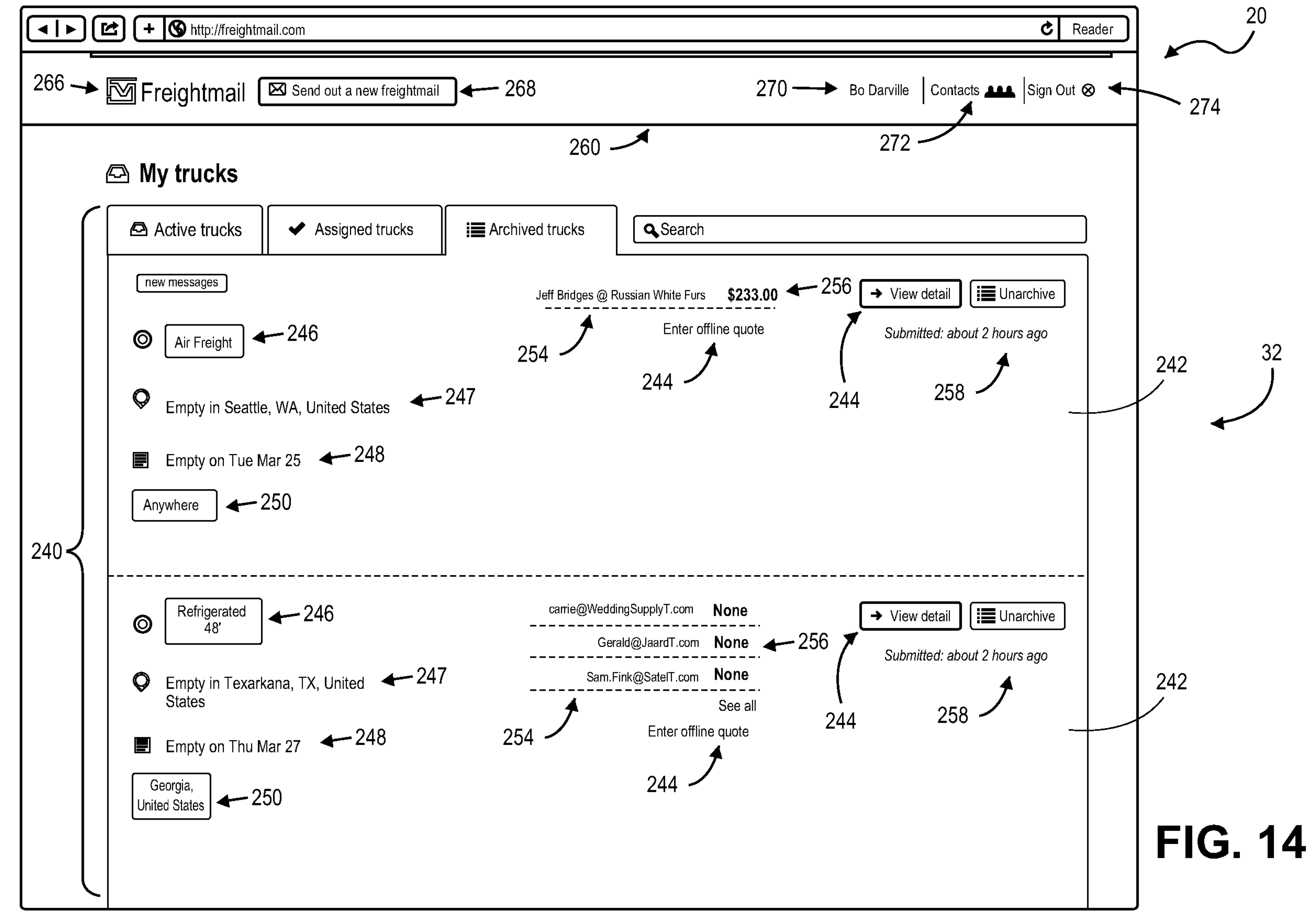
FIG. 14 is a screen capture depicting the graphical user interface of an embodiment of the invention depicting the cargo vehicle request list screen.

As will be discussed later, the computer program also presents to a carrier a graphical user interface (GUI) 20 that displays a variety of information related to cargo vehicle requests in an intuitive and easy-to-use manner is show in FIGS. 13-17. The information is provided via the GUI 20 in a format that allows the carrier to quickly manage multiple transactions and determine optimal choices related to bids from shippers. As shown in FIGS. 13 and 14, the GUI 20 displays a cargo vehicle request list screen 32 that contemporaneously displays a list of cargo vehicle requests created by the carrier, and one or more interface elements to receive user input. In other embodiments, each cargo vehicle request of the list of cargo vehicle requests provides a cargo vehicle detail screen 34 in response to user input. The cargo vehicle detail screen 34 provides the carrier tools to negotiate and accept bids received by various carriers regarding the shipment request. In yet other embodiment of the invention, the GUI 20 presents a create cargo vehicle request screen 36 that allows the carrier to create multiple cargo vehicle requests to one or more shippers. Once the new cargo vehicle requests are dispatched to the shippers, each shipper is presented with a shipper response list screen 38 on a second GUI 30 for management of the cargo vehicle requests received by the carrier and other cargo vehicle requests from other carriers.

When finding a carrier to ship items, a shipper must draft a shipment request containing relevant information about the shipment and solicit carriers to submit bids based on information in the shipment request. A shipment request is made up of the following: an origin, which is a location where the items to be shipped are located; a destination, which is a location where the items need to be shipped; a pickup date that is a calendar date when the items need to be picked up, the pickup date may be a day or may specify more detail such as a time of day; and equipment, which is the type of vehicle or vehicles needed to ship the items (e.g., a refrigerated 48-foot truck, air freight, intermodal 20-foot shipping container). In embodiments of the invention, a shipment request is made up of additional information such as special instructions, a target price, or a delivery time. In other embodiments, a shipment request also contains a label used for referencing the shipment request by the shipper or the carriers. In response to the shipment request each carrier must submit a bid (or "quote"), which is an amount that the carrier must be paid for the shipment along with any stipulations or changes to the terms of the shipment.

A shipment request has multiple statuses, including active, assigned, and archived. When a shipment request is first created, it defaults to the active status. An active status shipment request may receive bids from carriers or communication updates from the shipper or the carriers. An active status shipment request may change status to assigned or archived. An assigned status shipment request may not receive bids from carriers or communication updates from the shipper or the carriers. An assigned status shipment request may change status to active or archived. An archived status shipment request may not receive bids from carriers or communication updates from the shipper or the carriers. An archived status shipment request may change status to active or assigned.

Referring to FIGS. 2 and 3, the shipment request list screen 22 contemporaneously displays a list of shipment requests 40 created by the shipper, and one or more interface elements to receive user input. The list of shipment requests 40 are displayed in the order they were created with newer shipment requests above older shipment requests. In embodiments of the invention, the list of shipment requests 40 are displayed in order of pickup date. Each shipment request displays a shipment summary 42 representing each shipment request and one or more interaction elements 44. The shipment summary 42 is divided into three subdivisions. The subdivisions each display information relevant for the shipper to quickly review the progress of the shipment request. In embodiments of the invention, the interaction elements 44 provide the shipper with the ability to display a shipment request detail screen 24, as will be described later.

The first subdivision of the shipment summary 42 displays information about the shipment request entered by the shipper. The first subdivision displays the following pieces of information: the origin and destination 46, the pickup date 48, and the equipment 50. In embodiments of the invention where the shipment request has a label, the first subdivision displays a label 52 representing the label above the other elements of the first subdivision. Each of the elements (except the equipment 50) in the first subdivision is displayed with an icon on the left and text on the right. The equipment 50 is display as a slightly different shaded panel with text located inside the panel describing the vehicle needed for the shipment. In embodiments of the invention, the shipment request may dictate more than one vehicle needed and in that case multiple panels are displayed proximal each other. The text is formatted in an easy-to-read format such that a shipper looking at the list of shipment requests 40 can easily understand the information. For example the text for the pickup date 48 is formatted as "Pick up on Wed March 26" for a shipment with a March $26^{th}$ date of pickup.

The second subdivision of the shipment summary 42 displays a set of bid statuses. In embodiments of the invention, the second subdivision also displays one or more of the interaction elements 44. The second subdivision simultaneously displays three bid statuses but it is appreciated that the GUI 20 may display a different number of bid statuses and that the display of three is for exemplary purposes. By displaying three bid statuses the shipper may quickly determine what multiple carriers are charging to complete the shipment request. The second subdivision displays the three lowest bids received from carriers but if less than three bids have been received the second subdivision still shows three indicating that the shipment request has not received any bids from potential carriers.

Each of the bid statuses has a carrier identifier 54 in black-colored text and a bid 56 for that carrier in green-colored text. The carrier identifier 54 displays the contact information of the carrier in the following format: first and last name, the character '@', and the name of the carrier; if only the email address is known then just display of the email address. The bid 56 displays the current amount that the carrier has submitted for completing the shipment request. If the displayed carrier has not submitted any amount the bid 56 is displayed as the word "None" to indicate no submission from the carrier.

The third subdivision of the shipment summary 42 displays an interaction element 44 for the shipment request and a date element 58 representing the time when the shipment request was created. In an exemplary embodiment, the interaction element 44 is a blue button with a white arrow and the words "View detail" in white text to draw attention to the interaction element. As will be described later, the interaction elements 44 allow the shipper to view the shipment request detail screen 24. In embodiments of the invention, the third subdivision also displays an interface element to switch the status of the shipment request to archived or unarchived.

The shipment request list screen 22 also displays one or more interface elements operable to receive user input. The interface elements comprise a top bar 60 above the other elements of the GUI 20, a plurality of tabs 62 for looking at sublists of shipment requests, and a search box 64 for refining the sublists of shipment requests. The top bar 60 has the following interface elements: list shipment requests 66, create shipment request 68, user profile 70, contacts 72, and logout 74. The top bar 60 is useful because it is displayed regardless of the screen being displayed. The list shipment requests 66 interface element upon user input instructs the GUI 20 to display the shipment request list screen 22. The list shipment requests 66 interface element is displayed with a prominent icon and the text "Freightmail." As will be discussed later, the create shipment request 68 interface element upon user input instructs the GUI 20 to display the create shipment request screen 26. The user profile 70 interface element is text with the shipper's first name and last name and upon user input instructs the GUI 20 to display the shipper's account info. The contacts 72 interface element is the text "Contacts" and upon user input instructs the GUI 20 to display an updatable list of carriers. The logout 74 interface element displays the text "Sign out" and upon user input instructs the computer program to disconnect the shipper and save all information.

The plurality of tabs 62 and the search box 64 interface elements enable the user to filter the list of shipment requests 40. The plurality of tabs 62 comprise an active shipments tab, an assigned shipments tab, and an archived shipments tab. Each of the tabs has an icon and text. The plurality of tabs 62 are located between the top bar 60 and the list of shipment requests 40. The active shipments tab is displayed by default by the GUI 20. The active shipments tab, upon user input, instructs the GUI 20 to display only those shipment requests that are active and not yet assigned. The assigned and archived shipments tabs, upon user input, instruct the GUI 20 to display only those shipment requests that are assigned or archived, respectively. The search box 64 interface element receives user input in the form of text entry. As the user inputs text into the search box 64 the current tab displays a refined list of shipment requests 40 to match only those shipment requests containing the text.

In embodiments, and referring to FIGS. 4-7, the GUI 20 displays a shipment request detail screen 24 in response to user input. The shipment request detail screen 24 comprises the top bar 60 from the shipment request list screen 22, a first area with details regarding the particular shipment request, and a second area with details of the carriers selected by the shipper to bid upon the shipment request. The first area is displayed on the left side of the screen and the second area is displayed on the right side of the screen. In embodiments of the invention, the first area is displayed above the second area.

The first area displays information about the shipment request including the following: the label 52 (if a label is provided), the origin and the destination 46, the pickup date 48, and the equipment 50. This is the same information displayed by the first subdivision of the shipment summary 42 on the shipment request list screen 22. Moreover, the information is displayed in the same general manner with the same icons and text. The first area also displays the date element 58 representing the date the shipment request was created and any additional information provided by the shipper. Next, the first area displays an interface element to edit the information about the shipment request. Finally, the first area displays a map 76 containing the origin and the destination. It is appreciated that the first area is described for exemplary purposes and the first area may have a different layout or display different information regarding shipment request.

The second area of the shipment request detail screen 24 displays a title 78, one or more interface elements, a lowest bid 80, a first collapsible section 82 and a second collapsible section 84. The title 78 is the text "Quoting Activity-" the origin and the destination, and is prominently displayed by larger font. In embodiments of the invention, the title 78 utilizes different fonts, icons, text colorations, background shading, or other techniques to set itself apart from the rest of the shipment request detail screen 24. The interface elements include an add carriers button 86 to solicit additional carriers for bids and an activate/archive toggle 88 for changing the status of the shipment request. The lowest bid 80 displays the text "Lowest quote price" in black-colored text and the value of the lowest bid from any carrier in green-colored text.

The first collapsible section 82 displays the text "Other messages or quotes received" and a number representing the number of carriers that have either submitted a bid or sent a message to the shipper. The number is in white-colored text with a green-colored background. In the first collapsible section is a list of communication summaries that display information regarding each carrier. The communication summary comprises the carrier identifier 54, a timestamp 90 of the last communication or bid, a bid status 92, and a bid/assign button 94. The carrier identifier 54 is displayed in a similar manner to the shipment request list screen 22. In addition, the carrier identifier 54 is an interaction element and in response to user input displays a message/bid dialog (not depicted). The message/bid dialog allows the shipper and the carrier to negotiate details of the shipment request. In embodiments of the invention, each communication summary additionally displays the last message 96 sent by the shipper or the carrier. This prevents the shipper from having to click on the carrier identifier 54 to display the message/bid dialog.

The bid status 92 and the bid/assign button 94 are displayed to the right of the other elements of the communication summary. The bid status 92 is displayed with white-colored text on a green-colored background. The bid status 92 displays the value of the lowest bid submitted by a carrier. If a carrier has communicated with the shipper but has not submitted a bid the bid status 92 displays the text "No quote yet." The big/assign button 94 displays the text "Enter quote" if a carrier has not submitted a bid and the text "Assign shipment" if a carrier has submitted a bid. The shipper may click the bid/assign button 94 to either enter a quote that was submitted through a telephone or accept the bid of the carrier and update the status of the shipment request to assigned.

The second collapsible section 84 displays the text "No messages or quotes received" and a number representing the number of carriers that have not submitted a bid or have not yet sent a message to the shipper. The number is in white-colored text with a grey-colored background. In the second collapsible section 84 are additional communication summaries that display information regarding each carrier that has not yet submitted a bid or with a lack of communication activity. As stated above, the first collapsible section 82 is not collapsed and the second collapsible section 84 is collapsed upon navigation to the shipment request detail screen 24. This ensures that users are visually drawn towards the first collapsible section 82. If there are no bids or messages exchanged with any carriers the second collapsible section 84 is not collapsed by default. In embodiments of the invention, both sections are collapsed by default. In other embodiments of the invention, both sections are not collapsed by default.

Figure 8:
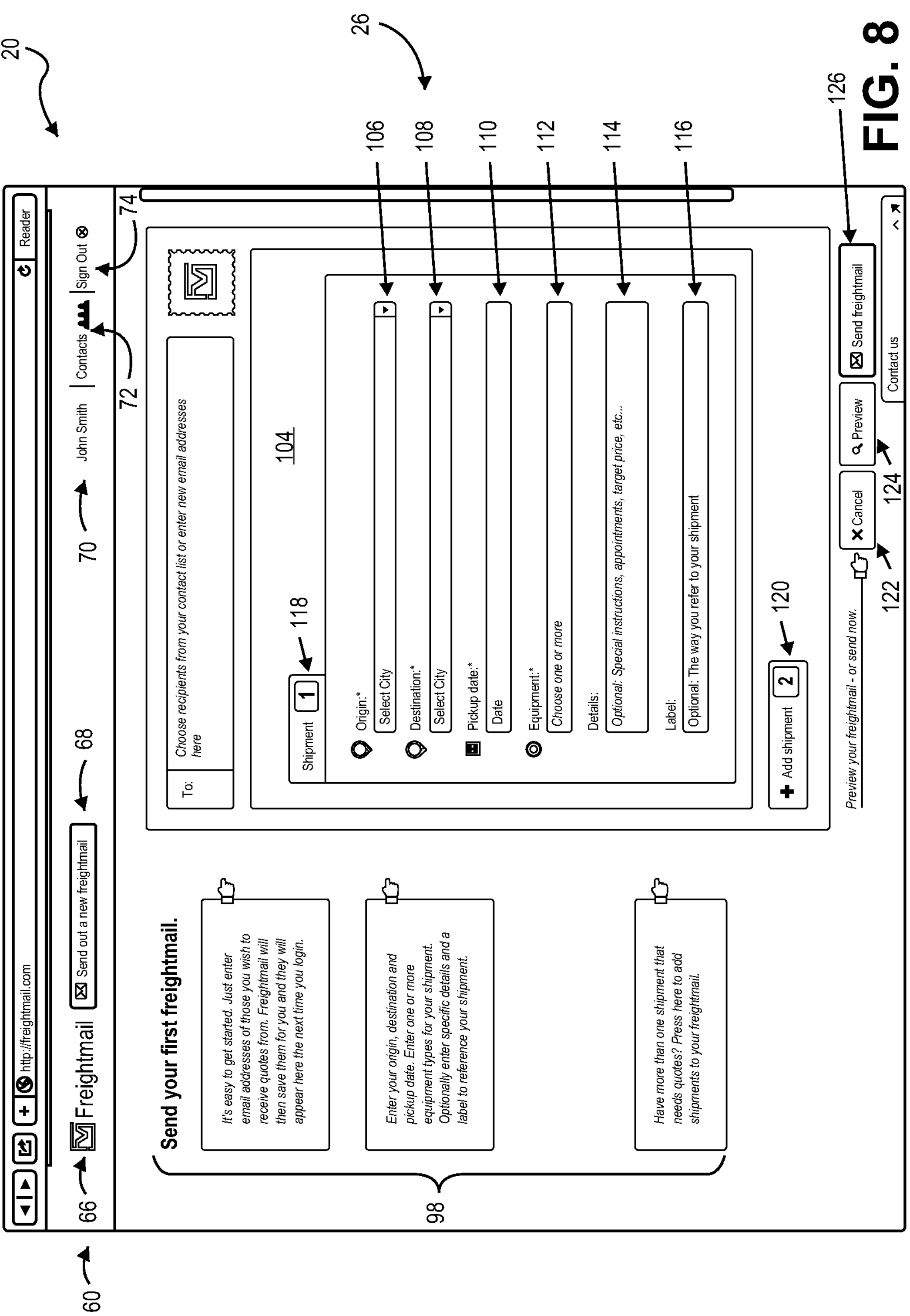
FIG. 8 is a screen capture depicting the graphical user interface of an embodiment of the invention displaying the create shipment request screen.
Figure 10:
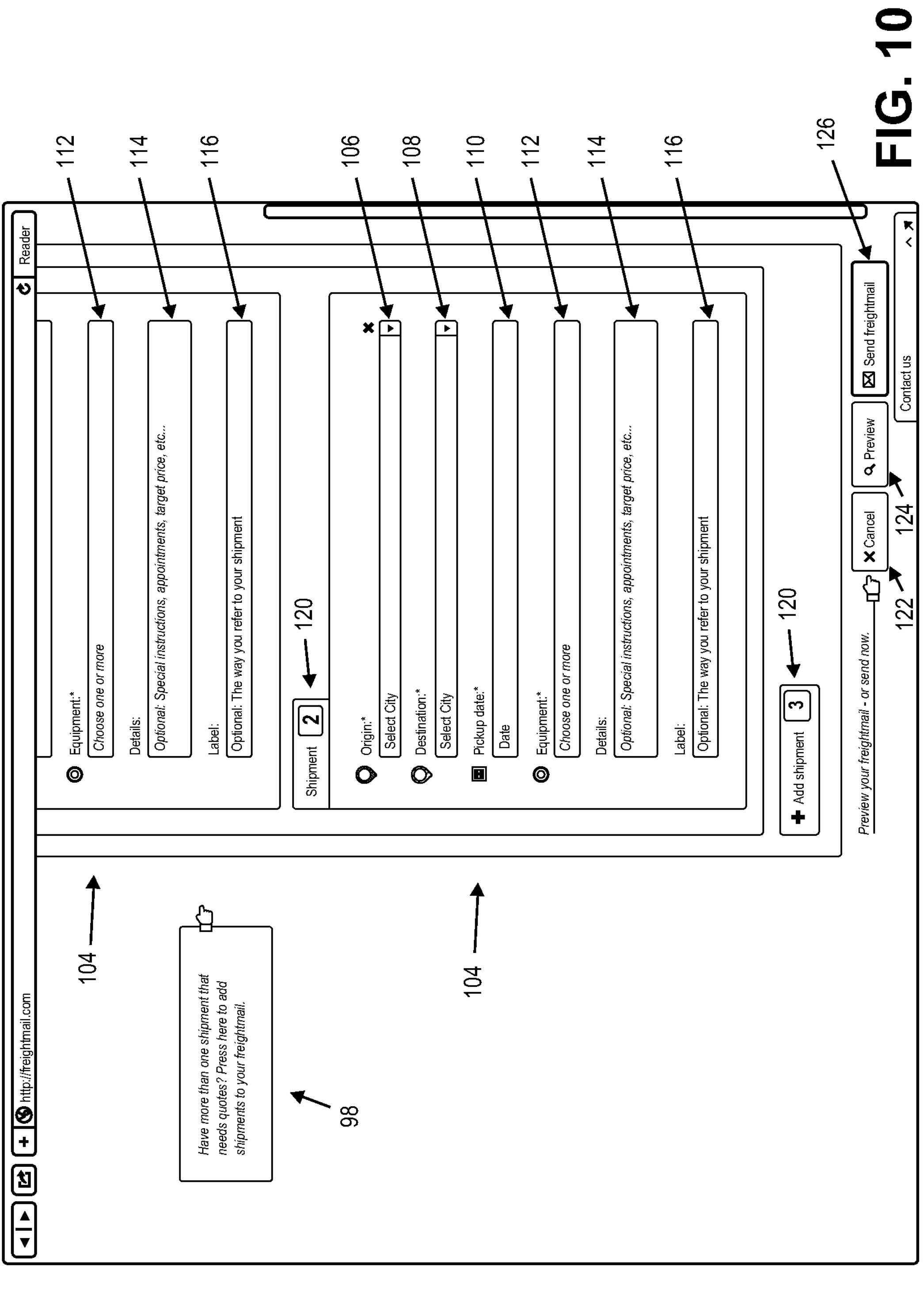
FIG. 10 is a screen capture depicting the graphical user interface of an embodiment of the invention depicting the create shipment request screen.

In embodiments of the invention, the GUI displays a create shipment request screen 26. As shown in FIGS. 8-10, the create shipment request screen 26 comprises the top bar 60 in a similar manner and location as the other screens, a first area located on the left and below the top bar, and a second area on the right and below the top bar. The first time a shipper loads the create shipment request screen 26, the first area displays a plurality of help items 98. The plurality of help items 98 include text that describes how to use the create shipment request screen. In other embodiments, the plurality of help items 98 include, pictures, videos, or other media that describe how to use the create shipment request screen 26. If it is not the first time the shipper loads the create shipment request screen 26 the first area displays a list of carriers 100 that the shipper may select for sending a shipment request. Beside each carrier is an interface element that allows the shipper to select each carrier that visually updates upon selection.

The second area comprises a first subarea, a second subarea and one or more interface elements. The first subarea displays a carrier input 102 and a shipment request input 104. The shipment request input 104 displays an origin input 106, a destination input 108, a pickup date input 110, an equipment input 112, a detail input 114, and a label input 116. The elements of the shipment request input 104 are located proximate to each other and bordered by a section label 118. The section label 118 displays the text "Shipment 1." As described earlier, the first subdivision of the shipment request list screen 22 displays information with an icon on the left and text on the right. The origin input 106, the destination input 108, and the pickup date input 110 share similar icons except that the origin input and the destination input use the same icon with different colors.

The carrier input 102 is a text box with the label "To:" to the left of the text box. The carrier input 102 displays the text "Choose recipients from your contact list or enter new email addresses" until user input is provided and then the text disappears. In detail, as the shipper inputs text into the carrier input 102, the computer program searches the list of carriers 100 and displays the list with underlines for the carriers that match the text input by the shipper. The shipper may either select text from the list displayed by the carrier input 102 or hit the return or space keyboard key to input a new carrier. The carrier input 102 may contain multiple carriers. If the shipper selects a carrier in the list of carriers 100 the carrier will already be displayed in the carrier input 102. Conversely, as the shipper selects existing carriers through the carrier input 102 the interface element updates to show the carrier is selected in the first area, thus reinforcing the relationship between the list of carriers 100 and the carrier input 102.

The origin input 106 is a text box with the label "Origin:" above the text box. The origin input 106 displays the text "Select City" until a shipper begins to provide user input and then the text disappears. As the shipper inputs text the origin input 106 displays a list of cities with underlines for the parts that match the text input by the shipper. The shipper may select from the list of cities. Once selected the city is displayed in the origin input 106.

The destination input 108 is a text box with the label "Destination:" above the text box. The destination input 108 displays the text "Select City" until a shipper begins to provide user input and then the text disappears. As the shipper inputs text the destination input 108 displays a list of cities with underlines for the parts that match the text input by the shipper. The shipper may select from the list of cities. Once selected the city is displayed in the destination input 108.

The pickup date input 110 is a text box with the label "Pickup date:" above the text box. The pickup date input displays the text "Date" until a shipper begins to provide user input and then the text disappears. The user input prompts the display of a calendar that allows the date to be selected. Once selected the date is displayed in the pickup date input.

The equipment input 112 is a text box with the label "Equipment:" above the text box. The equipment input 112 displays the text "Choose one or more" until a shipper begins to provide user input and then the text disappears. As the shipper inputs text the equipment input 112 displays a list of cargo vehicles with underlines for the parts that match the text input by the shipper. The shipper may select from the list of cargo vehicles or continue typing to request a cargo vehicle not on the list. Once selected the cargo vehicle (or vehicles) is displayed in the equipment input 112.

The detail input 114 is a text box with the label "Details:" above the text box. The detail input 114 displays the text "Optional: Special instructions, appointments, target price, etc . . . " until a shipper begins to provide user input and then the text disappears. The shipper inputs text and the detail input 114 displays the text.

The label input 116 is a text box with the label "Label:" above the text box. The label input 116 displays the text "Optional: The way you refer to your shipment" until a shipper begins to provide user input and then the text disappears. The shipper inputs text and the label input 116 displays the text.

The second subarea displays an interface element 120 that responds to user input. The interface element 120 has the text "Add shipment" and a number representing the shipment request number. Upon user input the interface element 120 displays an additional shipment request input 104 and the interface element with an updated number now incremented by one. For example, the section label 118 of the first subarea displays the text "Shipment 1" for the shipment request input 104. The second subarea displays the interface element 120 as "Add shipment 2." Upon user input the interface element 120 now displays a second shipment request input 104 with the text "Shipment 2" and also displays "Add shipment 3" below the second shipment request input. Thus the shipper may create multiple shipment requests at the same time and send all of them to the carriers.

The interface elements of the create shipment request screen 26 are displayed below the second subarea. The interface elements include the following: cancel 122, preview 124, and create shipment request 126. The cancel interface element 122 displays the text "Cancel" and accepts user input. Upon user input of the cancel interface element 122 the computer program deletes the shipment request and the GUI 20 displays the shipment request list screen 22. The preview interface element 124 displays the text "Preview" and accepts user input. Upon user input of the preview interface element 124 the GUI 20 displays a preview of the shipment requests as they will be provided to the carriers along with the cancel interface element 122 and the create shipment request interface element 126.

Figure 11:
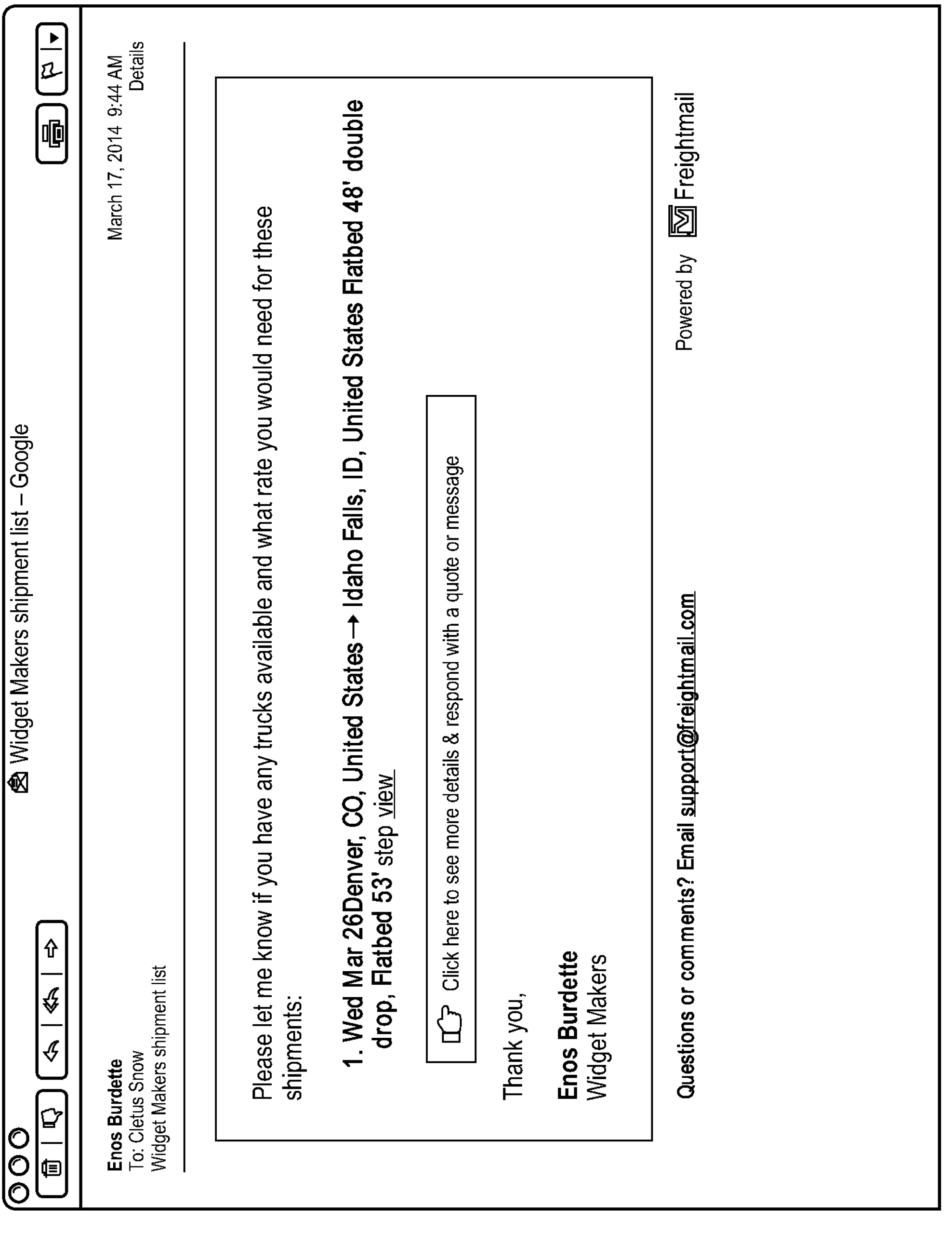
FIG. 11 is an exemplar message generated by the computer program of an embodiment of the invention sent to a carrier.

The create shipment request interface element 126 displays the text "Send freightmail" in white-colored text on a blue-colored background. The create shipment request interface element 126 accepts user input. In detail, upon user input the create shipment request interface element 126 the computer program creates the shipment request (or requests) and updates the GUI 20 to display the shipment request list screen 22 but with the additional shipment request(s). The computer program also sends a message to the carrier (or carriers) selected by the shipper. The message is sent using the communications network 14 and provides a prompt for the carrier(s) to respond to the shipment requests. An exemplar message is shown in FIG. 11. It is appreciated that the message may be through email, electronic message, robotic telephone caller, SMS or any other communications technology.

Figure 12:
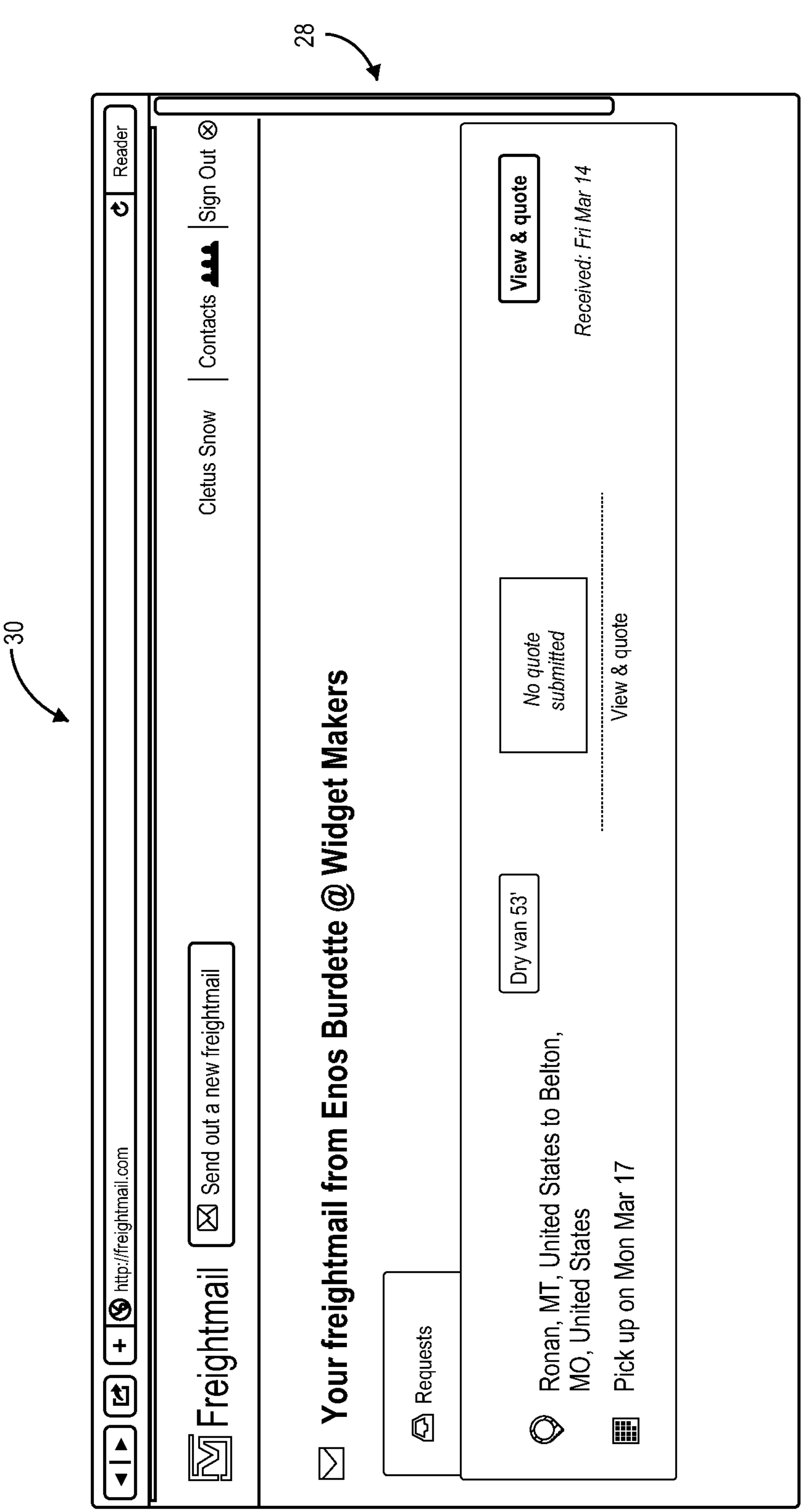
FIG. 12 is a screen capture depicting the second graphical user interface of an embodiment of the invention depicting the carrier response list screen.

Upon response by a carrier (or carriers) the computer program provides a second GUI (or GUIs) 30. As shown in FIG. 12, the second GUI 30 displays a carrier response list screen 28 similar to the shipment request list screen 22 and a carrier response detail screen (not depicted) similar to the shipment request detail screen 24, respectively. The carrier response list screen 28 displays all of the shipment requests received by the shipper and any additional shipment requests from other shippers. The carrier response detail screen displays the details of the shipment request and provides similar tools to those provided to the shipper.

As mentioned earlier, the computer program also presents to a carrier a graphical user interface (GUI) 20 that displays a variety of information related to cargo vehicle requests in an intuitive and easy-to-use manner is show in FIGS. 13-17. The information is provided via the GUI in a format that allows the carrier to quickly manage multiple transactions and determine optimal choices related to bids from shippers. The GUI displays a cargo vehicle request list screen 32 that contemporaneously displays a list of cargo vehicle requests created by the carrier, and one or more interface elements to receive user input. In other embodiments, each cargo vehicle request of the list of cargo vehicle requests provides a cargo vehicle detail screen 34 in response to user input. The cargo vehicle detail screen 34 provides the carrier tools to negotiate and accept bids received by various carriers regarding the shipment request. In yet other embodiment of the invention, the GUI 20 presents a create cargo vehicle request screen 36 that allows the carrier to create multiple cargo vehicle requests to one or more shippers. Once the new cargo vehicle requests are dispatched to the shippers, each shipper is presented with a shipper response list screen 38 on a second GUI 30 for management of the cargo vehicle requests received by the carrier and other cargo vehicle requests from other carriers.

When finding a shipper that needs an item shipped, a carrier must draft a cargo vehicle request containing relevant information about the cargo vehicle and solicit shippers to submit bids based on information in the cargo vehicle request. A cargo vehicle request is made up of the following: an empty location, which is a location where the cargo vehicle will be located when it is able to receive items; a destination, which is where the carrier is willing to ship an item; an empty date that is a calendar date when the cargo vehicle is available; and equipment, which is the type of cargo vehicle (or vehicles) available to ship the items (e.g., a refrigerated 48-foot truck, air freight, intermodal 20-foot shipping container). In embodiments of the invention, a cargo vehicle request is made up of additional information such as special instructions, a target price, or a pickup or delivery time. In other embodiments, a cargo vehicle request also contains a label used for referencing the cargo vehicle request by the carrier or the shipper. In response to the cargo vehicle request each shipper must submit a bid (or "offer"), which is an amount that the carrier must be paid for use of the cargo vehicle along with any stipulations or changes to the usage terms.

A cargo vehicle request has multiple statuses, including active, assigned, and archived. When a cargo vehicle request is first created, it defaults to the active status. An active status cargo vehicle request may receive bids from shippers or communication updates from the carrier or the shippers. An active status cargo vehicle request may change status to assigned or archived. An assigned status cargo vehicle request may not receive bids from shippers or communication updates from the carrier or the shippers. An assigned status cargo vehicle request may change status to active or archived. An archived status cargo vehicle request may not receive bids from shippers or communication updates from the carrier or the shippers. An archived status cargo vehicle request may change status to active or assigned.

Referring to FIGS. 13 and 14, the cargo vehicle request list screen 32 contemporaneously displays a list of cargo vehicle requests 240 created by the carrier, and one or more interface elements to receive user input. The list of cargo vehicle requests 240 are displayed in the order they were created with newer cargo vehicle requests above older shipment requests. In embodiments of the invention, the list of cargo vehicle requests 240 are displayed in order of availability. Each cargo vehicle request displays a cargo vehicle summary 242 representing each cargo vehicle request and one or more interaction elements 244. The cargo vehicle summary 242 is divided into three subdivisions. The subdivisions each display information relevant for the carrier to quickly review the progress of the cargo vehicle request. In embodiments of the invention, the interaction elements 244 provide the carrier with the ability to display a cargo vehicle detail screen 34, as will be described later.

The first subdivision of the cargo vehicle summary 242 displays information about the cargo vehicle request entered by the carrier. The first subdivision displays the following pieces of information: the equipment 246, the empty location 247, the empty date 248, and the destination 250. In embodiments of the invention where the cargo vehicle request has a label, the first subdivision displays a label 252 representing the label above the other pieces of information of the first subdivision. Each of the elements (except the destination 250) in the first subdivision is displayed with an icon on the left and text on the right. The destination 250 is display as a slightly different shaded panel with text located inside the panel describing the destination to which the cargo vehicle is willing to travel. In embodiments of the invention, the cargo vehicle request may dictate more than one destination the carrier is willing to send the cargo vehicle and multiple panels are displayed proximal each other. The text is formatted in an easy-to-read format such that a carrier looking at the list of cargo vehicle requests can easily understand the information. For example the text for the empty date 248 is formatted as "Empty on Wed March 26" for a cargo vehicle with a March 26$^{th}$ empty date.

The second subdivision of the cargo vehicle summary 242 displays a set of bid statuses. In embodiments of the invention, the second subdivision also displays one or more of the interaction elements 244. The second subdivision simultaneously displays three bid statuses but it is appreciated that the GUI 20 may display a different number of bid statuses and that the display of three is for exemplary purposes. By displaying three bid statuses the carrier may quickly determine what multiple shippers are willing to pay for the use of the cargo vehicle. The second subdivision displays the three lowest bids received from shippers but if less than three bids have been received the second subdivision still shows three indicating that the cargo vehicle request has not received any bids from potential shippers.

Each of the bid statuses has a shipper identifier 254 in black-colored text and a bid 256 for that shipper in green-colored text. The shipper identifier 254 displays the contact information of the shipper in the following format: first and last name, the character '@', and the name of the shipper; if only the email address is known then just display of the email address. The bid 256 displays the current amount that the shipper has bid for completing the cargo vehicle request. If the displayed shipper has not submitted any amount the bid 256 is displayed as the word "None" to indicate no bid from the shipper.

The third subdivision of the cargo vehicle summary 242 displays an interaction element 244 for the cargo vehicle request and a date element 258 representing the time when the cargo vehicle request was created. In an exemplary embodiment, the interaction element 244 is a blue button with a white arrow and the words "View detail" in white text to draw attention to the interaction element. As will be described later, the interaction elements 244 allow the shipper to view the cargo vehicle detail screen 34. In embodiments of the invention, the third subdivision also displays an interface element to switch the status of the shipment request to archived or unarchived.

The cargo vehicle request list screen 32 also displays one or more interface elements operable to receive user input. The interface elements comprise a top bar 260 consistent at the top of GUI 20, a plurality of tabs 262 for looking at sublists of cargo vehicle requests, and a search box 264 for refining the sublists of cargo vehicle requests. The top bar 260 has the following interface elements: list cargo vehicle requests 266, create cargo vehicle request 268, user profile 270, contacts 272, and logout 274. The top bar 260 is useful because it is displayed regardless of the screen being displayed. The list cargo vehicle requests 266 interface element upon user input instructs the GUI 20 to display the cargo vehicle request list screen 22. The list cargo vehicle requests

266 interface element is displayed with a prominent icon and the text "Freightmail." As will be discussed later, the create cargo vehicle request 268 interface element upon user input instructs the GUI 20 to display the create cargo vehicle request screen 36. The user profile 270 interface element is text with the carrier's first name and last name and upon user input instructs the GUI 20 to display the carrier's account info. The contacts 272 interface element is the text "Contacts" and upon user input instructs the GUI to display an updatable list of shippers. The logout 274 interface element displays the text "Sign out" and upon user input instructs the computer program to disconnect the shipper and save all information.

The plurality of tabs 262 and the search box 264 interface elements enable the user to filter the list of cargo vehicle requests 240. The plurality of tabs 262 comprise an active cargo vehicle tab, an assigned cargo vehicle tab, and an archived cargo vehicle tab. Each of the tabs has an icon and text. The plurality of tabs 262 are located between the top bar 260 and the list of cargo vehicle requests 240. The active cargo vehicle tab is displayed by default by the GUI 20. The active cargo vehicle tab, upon user input, instructs the GUI 20 to display only those shipment requests that are active and not yet assigned. The assigned and archived cargo vehicle tabs, upon user input, instruct the GUI 20 to display only those cargo vehicle requests that are assigned or archived, respectively. The search box 264 interface element receives user input in the form of text entry. As the user inputs text into the search box 264 the current tab displays a refined list of cargo vehicle requests 240 to match only those cargo vehicle requests containing the text.

Figure 15:
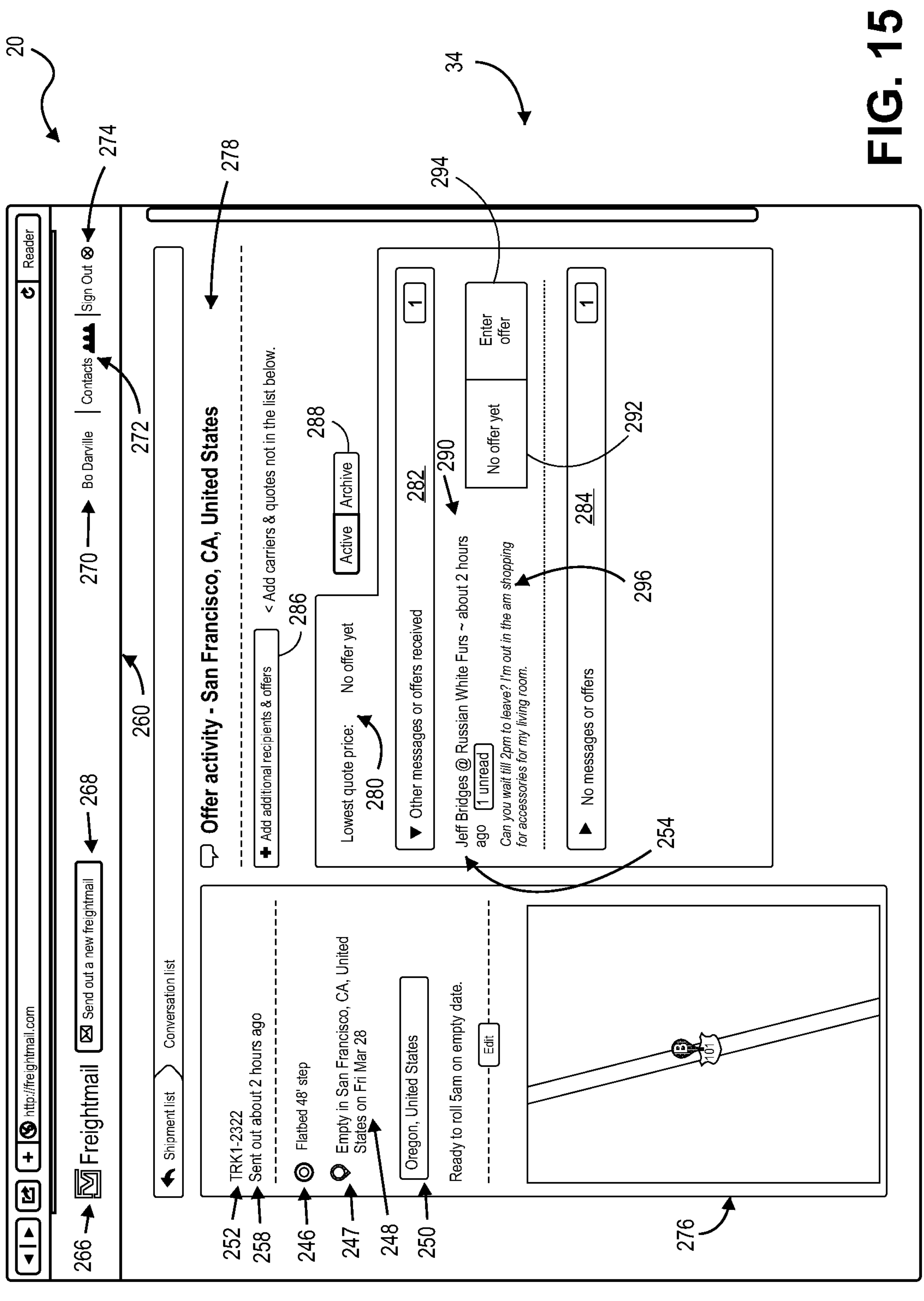
FIG. 15 is a screen capture depicting the graphical user interface of an embodiment of the invention depicting the cargo vehicle detail screen.

In embodiments, and referring to FIG. 15, the GUI 20 displays a cargo vehicle detail screen in response 34 to user input. The cargo vehicle detail screen 34 comprises the top bar 260 from the cargo vehicle request list screen 32, a first area with details regarding the particular cargo vehicle request, and a second area with details of the shippers selected by the carrier to bid upon the cargo vehicle request. The first area is displayed on the left side of the screen and the second area is displayed on the right side of the screen. In embodiments of the invention, the first area is displayed above the second area.

The first area displays information about the cargo vehicle request including the following: the label 252 (if a label is provided), the equipment 246, the empty location 247 and empty date 248, and the destination 250. This is the same information displayed by the first subdivision of the cargo vehicle summary 242 on the cargo vehicle request list screen 32. Moreover, the information is displayed in the same general manner with the same icons and text. The first area also displays the date element 258 representing the date the cargo vehicle request was created and any additional information provided by the carrier. Next, the first area displays an interface element to edit the information about the cargo vehicle request. Finally, the first area displays a map 276 containing the empty location. It is appreciated that the first area is described for exemplary purposes and the first area may have a different layout or display different information regarding cargo vehicle request.

The second area of the cargo vehicle detail screen displays 34 a title 278, one or more interface elements, a lowest bid 280, a first collapsible section 282 and a second collapsible section 284. The title 278 is the text "Offer Activity-" and the empty location, and is prominently displayed by larger font. In embodiments of the invention, the title 278 utilizes different fonts, icons, text colorations, background shading, or other techniques to set itself apart from the rest of the cargo vehicle detail screen 34. The interface elements include an add shippers button 286 to solicit additional shippers for bids and an activate/archive toggle 288 for changing the status of the cargo vehicle request. The lowest bid 280 displays the text "Lowest quote price" in black-colored text and the value of the lowest bid from any shipper in green-colored text.

The first collapsible section 282 displays the text "Other messages or offers received" and a number representing the number of shippers that have either submitted a bid or sent a message to the carrier. The number is in white-colored text with a green-colored background. In the first collapsible section is a list of communication summaries that display information regarding each shipper. The communication summary comprises the shipper identifier 254, a timestamp 290 of the last communication or bid, a bid status 292, and a bid/assign button 294. The shipper identifier 254 is displayed in a similar manner to the cargo vehicle request list screen 32. In addition, the shipper identifier 254 is an interaction element and in response to user input the GUI displays a message/bid dialog (not depicted). The message/bid dialog allows the carrier and the shipper to negotiate details of the cargo vehicle request. In embodiments of the invention, each communication summary additionally displays the last message 296 sent by the carrier or the shipper. This prevents the carrier from having to click on the shipper identifier 254 to display the message/bid dialog.

The bid status 292 and the bid/assign button 294 are displayed to the right of the other elements of the communication summary. The bid status 292 is displayed with white-colored text on a green-colored background. The bid status 292 displays the value of the lowest bid submitted by a shipper. If a shipper has communicated with the carrier but has not submitted a bid the bid status 292 displays the text "No offer yet." The big/assign button 294 displays the text "Enter offer" if a shipper has not submitted a bid and the text "Assign offer" if a shipper has submitted a bid. The carrier may click the bid/assign button 294 to either enter an offer that was submitted through a telephone or accept the bid of the shipper and update the status of the cargo vehicle request to assigned.

The second collapsible section 284 displays the text "No messages or offers" and a number representing the number of shippers that have not submitted a bid or have not yet sent a message to the carrier. The number is in white-colored text with a grey-colored background. In the second collapsible section 284 are additional communication summaries that display information regarding each carrier that has not yet submitted a bid or with a lack of communication activity. As stated above, the first collapsible section 282 is not collapsed and the second collapsible section 284 is collapsed upon navigation to the shipment request detail screen 34. This ensures that users are visually drawn towards the first collapsible section 282. If there are no bids or messages exchanged with any carriers the second collapsible section 284 is not collapsed by default. In embodiments of the invention, both sections are collapsed by default. In other embodiments of the invention, both sections are not collapsed by default.

Figure 16:
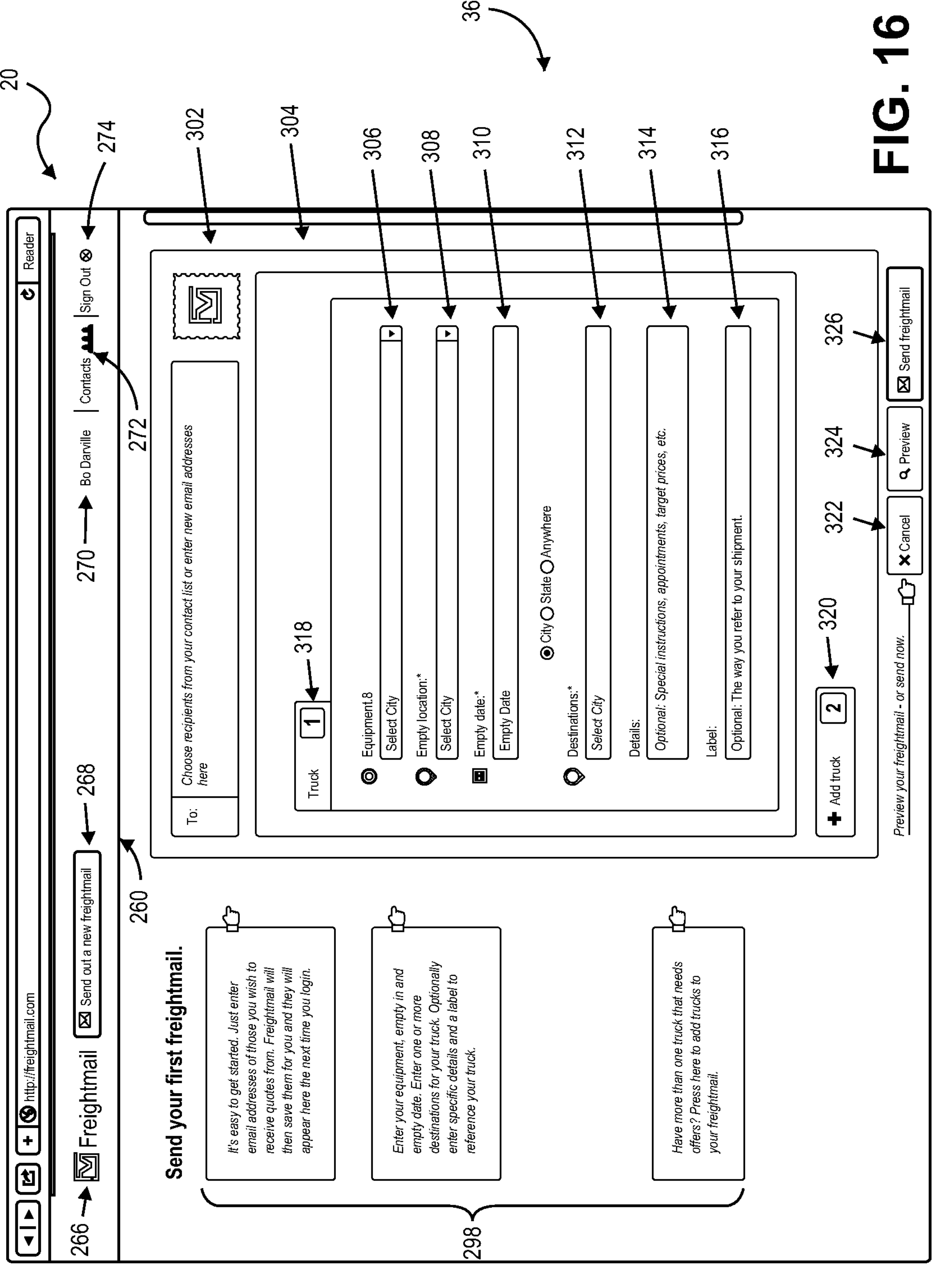
FIG. 16 is a screen capture depicting the graphical user interface of an embodiment of the invention depicting the create cargo vehicle request screen.
Figure 17:
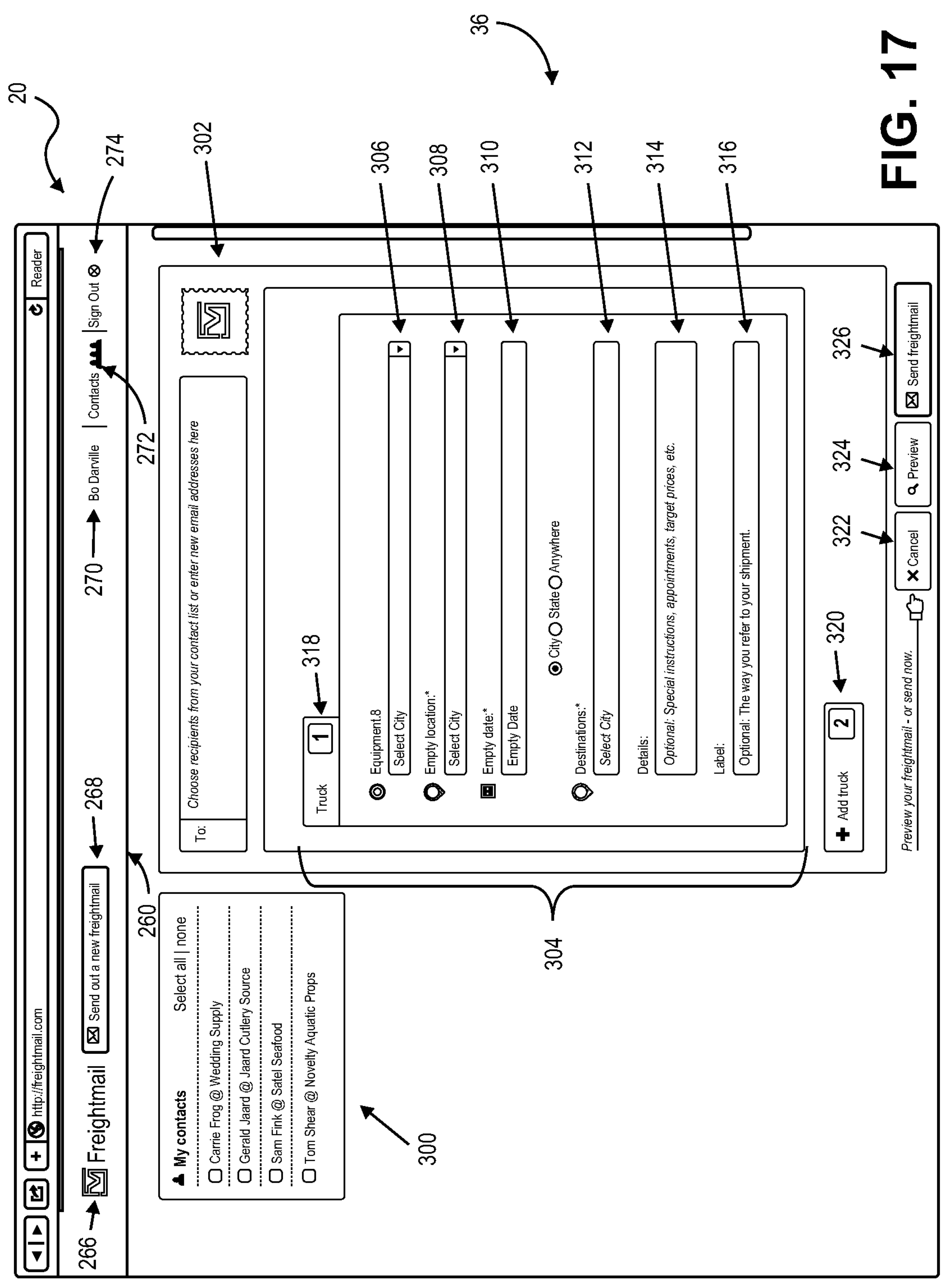
FIG. 17 is a screen capture depicting the graphical user interface of an embodiment of the invention depicting the create cargo vehicle request screen.

In embodiments of the invention, the GUI displays a create cargo vehicle request screen 36. As shown in FIGS. 16-17, the create cargo vehicle request screen 36 comprises the top bar 260 in a similar manner and location as the other screens, a first area located on the left and below the top bar, and a second area on the right and below the top bar. The first time a carrier loads the create cargo vehicle request screen 36, the first area displays a plurality of help items 298. The plurality of help items 298 include text that describes how to use the create cargo vehicle request screen 36. In other embodiments, the plurality of help items 298 include, pictures, videos, or other media that describe how to use the create cargo vehicle request screen 36. If it is not the first time the carrier loads the create cargo vehicle request screen 36 the first area displays a list of shippers 300 that the carrier may select for sending a cargo vehicle request. Beside each shipper is an interface element that allows the carrier to select each shipper that visually updates upon selection.

The second area comprises a first subarea, a second subarea and one or more interface elements. The first subarea displays a shipper input 302 and a cargo vehicle request input 304. The cargo vehicle request input 304 displays an equipment input 306, an empty location input 308, an empty date input 310, a destination input 312, a detail input 314, and a label input 316. The elements of the cargo vehicle request input 304 are located proximate to each other and bordered by a section label 318. The section label 318 displays the text "Truck 1." As described earlier, the first subdivision of the cargo vehicle request list screen 32 displays information with an icon on the left and text on the right. The elements of cargo vehicle request input 304 use similar icons.

The shipper input 302 is a text box with the label "To:" to the left of the text box. The shipper input 302 displays the text "Choose recipients from your contact list or enter new email addresses" until user input is provided and then the text disappears. In detail, as the carrier inputs text into the shipper input 302, the computer program searches the list of shippers 300 and displays the list with underlines for the shippers that match the text input by the carrier. The carrier may either select text from the list displayed by the shipper input 302 or hit the return or space keyboard key to input a new shipper. The shipper input 302 may contain multiple shippers. If the carrier selects a shipper in the list of shippers 300 the shipper will already be displayed in the shipper input 302. As the carrier selects existing shippers through the shipper input 302 the interface element updates to show the shipper is selected in the list of shippers 300, thus reinforcing the relationship between the list of shippers and the shipper input.

The equipment input 306 is a text box with the label "Equipment:" above the text box. The equipment input 306 displays the text "Choose one or more" until a carrier begins to provide user input and then the text disappears. As the carrier inputs text the equipment input 306 displays a list of cargo vehicles with underlines for the parts that match the text input by the carrier. The carrier may select from the list of equipment or continue typing to select a cargo vehicle not on the list. Once selected the cargo vehicle is displayed in the equipment input 306.

The empty location input 308 is a text box with the label "Empty Location:" above the text box. The empty location input 308 displays the text "Select City" until a carrier begins to provide user input and then the text disappears. As the carrier inputs text the empty location input 308 displays a list of cities with underlines for the parts that match the text input by the carrier. The carrier may select from the list of cities. Once selected the city is displayed in the empty location input 308.

The empty date input 310 is a text box with the label "Empty date:" above the text box. The empty date input 310 displays the text "Empty Date" until a shipper begins to provide user input and then the text disappears. The user input prompts the display of a calendar that allows the date to be selected. Once selected the date is displayed in the empty date input 310.

The destination input 312 is a text box with the label "Destinations:" and a toggle above the text box. The toggle displays the choices "City," "State," or "Anywhere" to the carrier. If the toggle is set to "City" the destination input 312 displays the text "Select City" until a carrier begins to provide user input and then the text disappears. As the carrier inputs text the destination input 312 displays a list of cities with underlines for the parts that match the text input by the carrier. The carrier may select from the list of cities. Once selected the city is displayed in the destination input 312. The carrier may select multiple cities. If the toggle is set to "State" the destination input 312 displays the text "Select State" until a carrier begins to provide user input and then the text disappears. As the carrier inputs text the destination input 312 displays a list of states with underlines for the parts that match the text input by the carrier. The carrier may select from the list of states. Once selected the state is displayed in the destination input 312. The carrier may select multiple states. If the toggle is set to "Anywhere" the text box disappears from the create cargo vehicle request screen.

The detail input 314 is a text box with the label "Details:" above the text box. The detail input 314 displays the text "Optional: Special instructions, appointments, target price, etc . . . " until a carrier begins to provide user input and then the text disappears. The carrier inputs text and the detail input 314 displays the text.

The label input 316 is a text box with the label "Label:" above the text box. The label input 316 displays the text "Optional: The way you refer to your shipment" until a carrier begins to provide user input and then the text disappears. The carrier inputs text and the label input 316 displays the text.

The second subarea displays an interface element 320 that responds to user input. The interface element 320 has the text "Add truck" and a number representing the cargo vehicle request number. Upon user input the interface element 320 displays an additional cargo vehicle request input 304 and the interface element with an updated number now incremented by one. For example, the section label 318 of the first subarea displays the text "Truck 1" for the cargo vehicle request input. The second subarea displays the interface element 320 as "Add truck 2." Upon user input the interface element 320 now displays a second cargo vehicle request input 304 with the text "Truck 2" and also displays "Add truck 3" below the second cargo vehicle request input. Thus the carrier may create multiple cargo vehicle requests at the same time and send all of them to the shippers.

The interface elements of the create cargo vehicle request screen 36 are displayed below the second subarea. The interface elements include the following: cancel 322, preview 324, and create cargo vehicle request 326. The cancel interface element 322 displays the text "Cancel" and accepts user input. Upon user input of the cancel interface element 322 the computer program deletes the cargo vehicle request and the GUI 20 displays the cargo vehicle request list screen 32. The preview interface element 324 displays the text "Preview" and accepts user input. Upon user input of the preview interface element 324 the GUI 20 displays a preview of the cargo vehicle requests as they will be provided to the carriers along with the cancel interface element 322 and the create cargo vehicle request interface element 326.

Figure 18:
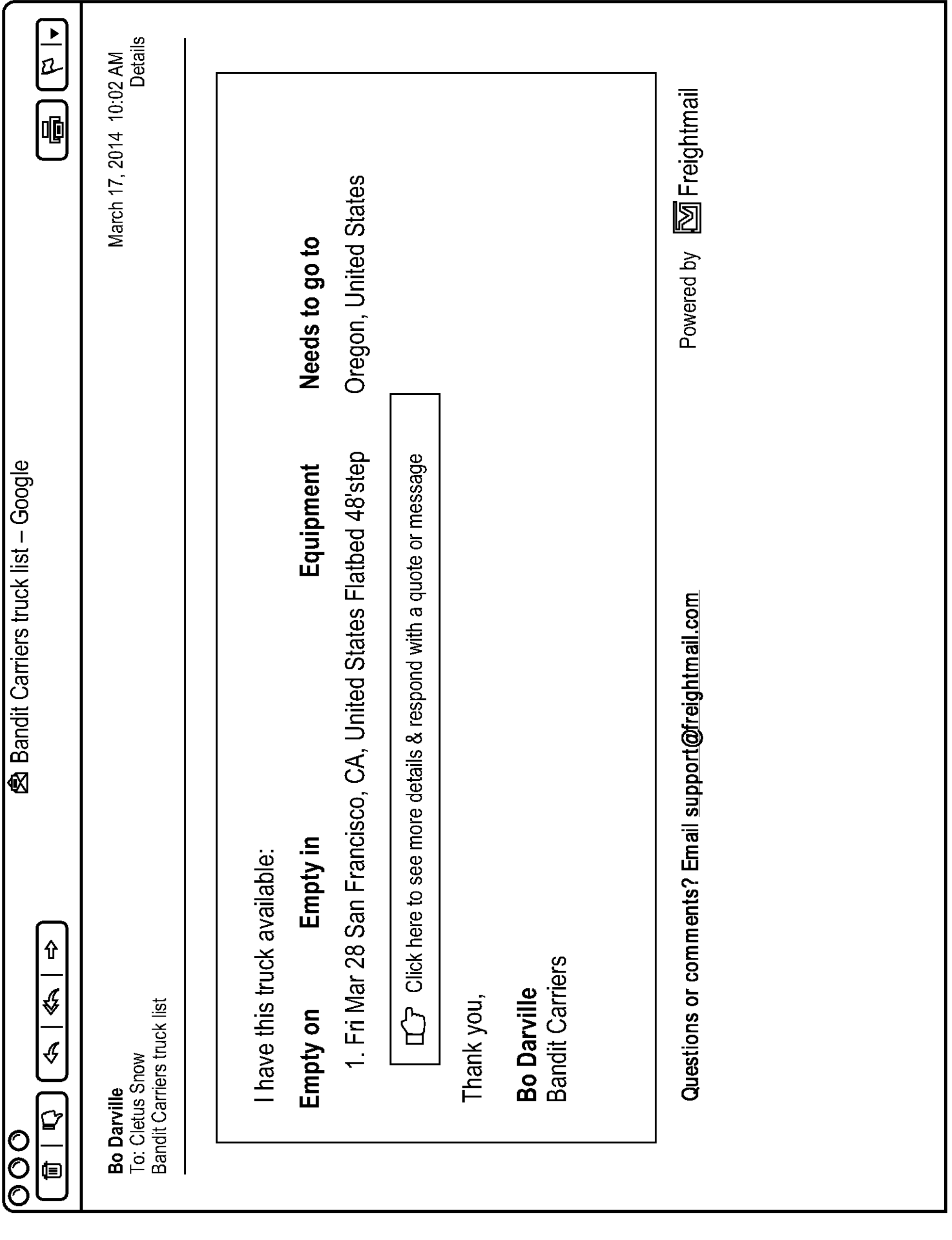
FIG. 18 is an exemplar message generated by the computer program of an embodiment of the invention sent to a shipper.

The create cargo vehicle request interface element 326 displays the text "Send freightmail" in white-colored text on a blue-colored background. The create cargo vehicle request interface element 326 accepts user input. In detail, upon user input of the create cargo vehicle request interface element 326 the computer program creates the cargo vehicle request (or requests) and updates the GUI 20 to display the cargo vehicle request list screen 32 but with the additional cargo vehicle request(s). The computer program also sends a message to the shipper (or shippers) selected by the carrier. The message is sent using the communications network 14 and provides a prompt for the shipper(s) to respond to the cargo vehicle requests. An exemplar message is shown in FIG. 18. It is appreciated that the message may be through email, electronic message, robotic telephone caller, SMS or any other communications technology.

Figure 19:
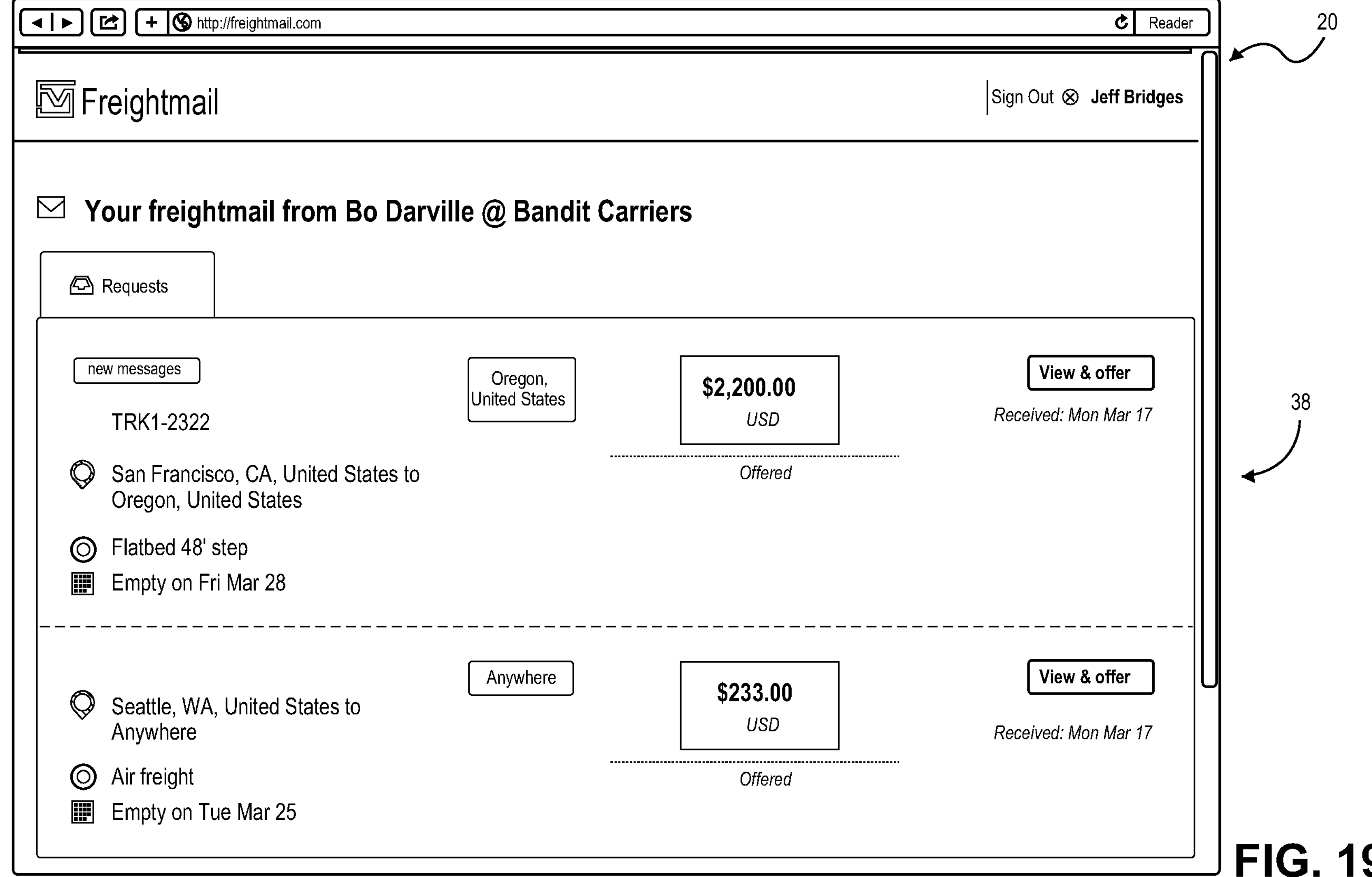
FIG. 19 is a screen capture depicting the second graphical user interface of an embodiment of the invention depicting the shipper response list screen.

Upon response by a shipper (or shippers) the computer program provides a second GUI (or GUIs) 30. As shown in FIG. 19, the second GUI 30 displays a shipper response list screen 38 similar to the cargo vehicle request list screen 32 and a shipper response detail screen (not depicted) similar to the cargo vehicle detail screen 34, respectively. The shipper response list screen 38 displays all of the cargo vehicle requests received by the carrier and any additional cargo vehicle requests from other carriers. The shipper response detail screen displays the details of the cargo vehicle request and provides similar tools to those provided to the carrier.

Figure 20:
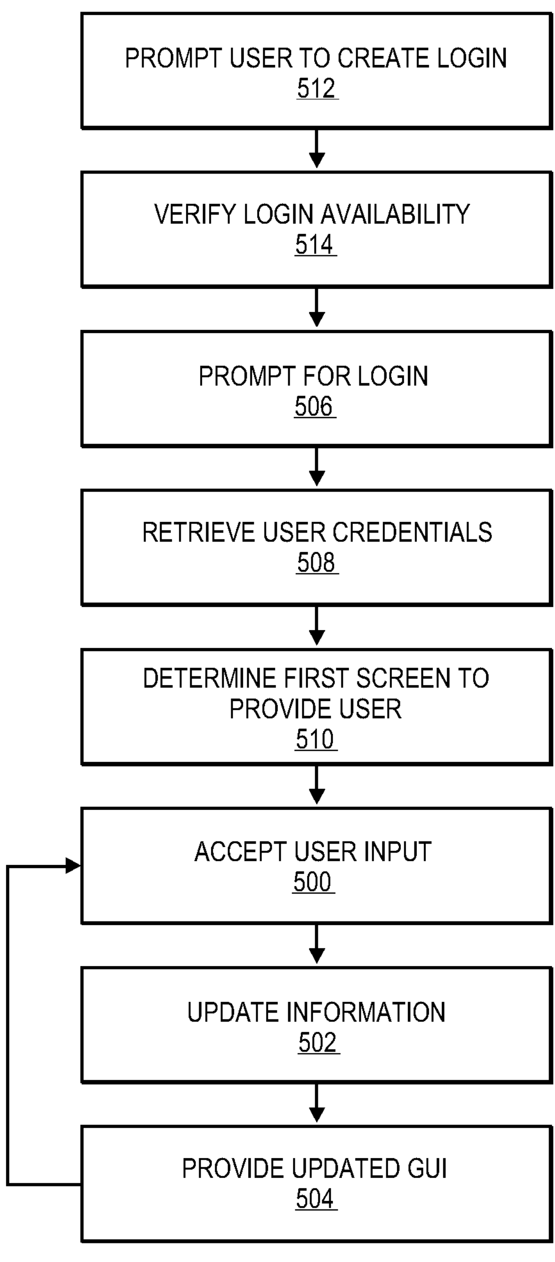
FIG. 20 is a flow diagram depicting a method of embodiments of the invention for providing the graphical user interface.
Figures 21, 22:
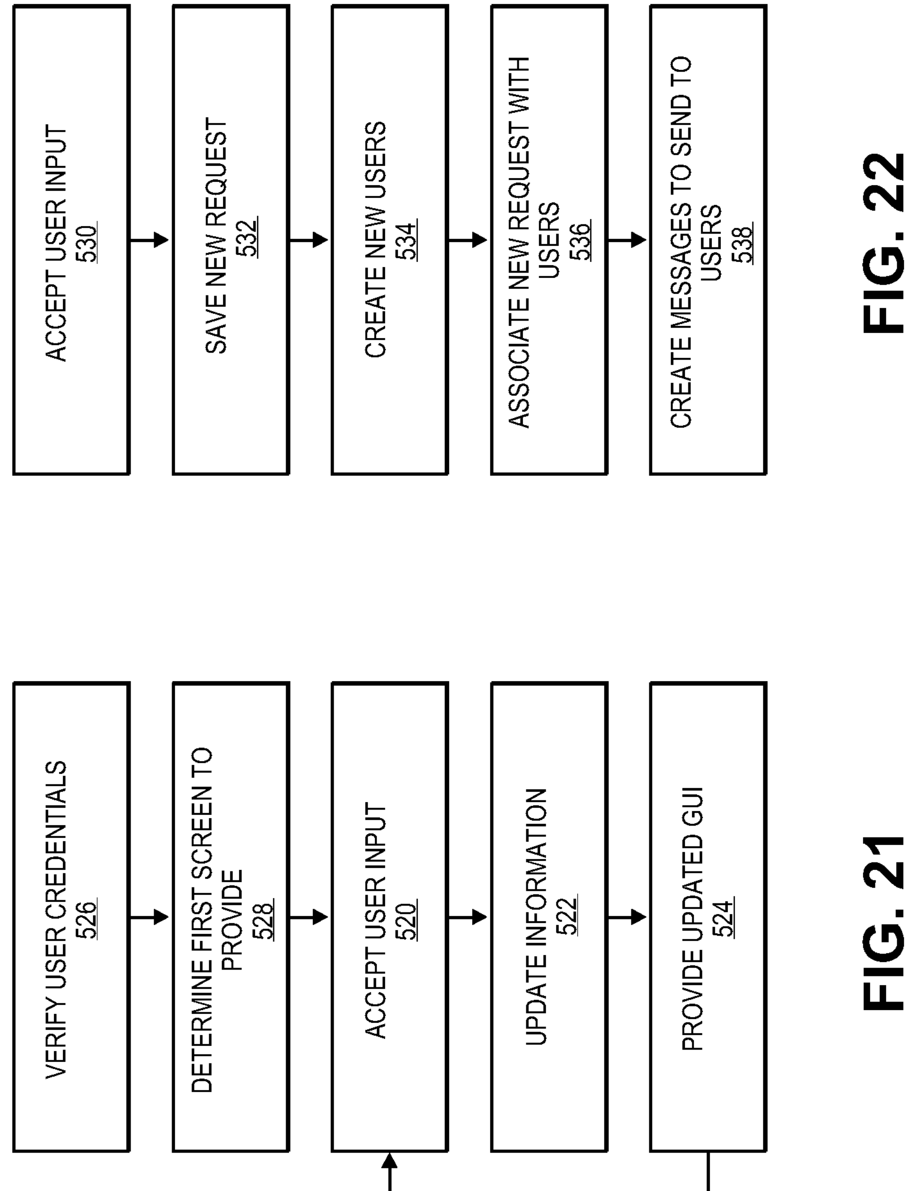
FIG. 21 is a flow diagram depicting a method of embodiments of the invention for providing the second graphical user interface.
FIG. 22 is a flow diagram depicting a method of embodiments of the invention for creating new requests.

Turning now to FIG. 20-22, execution of the computer program of embodiments of the invention performs steps of the method of embodiments of the invention. Because multiple users may be updating information stored, displayed, and acted upon by the computer program, information displayed by the computer program is displayed in real-time. "Real-time" as defined herein is when the processing element of the system 10 performs the steps less than every 1 second, every 500 milliseconds, every 100 milliseconds, or every 16 milliseconds.

The method of embodiments of the invention for providing the GUI broadly comprises the following steps: accepting user input 500, updating information in response to user input 502, providing an updated GUI 504. Initialization of the computer program by a user, as may occur when a new shipper or carrier begins to use the system, includes four additional steps: prompting for the user login 506, retrieving the credentials input by the user 508, determining the first screen of the GUI to provide to the user 510. Additional steps are also performed if the carrier or shipper has never used the system before: prompting the user to create a login 512, verifying the login is available 514.

The method of embodiments of the invention for providing the secondary GUI broadly comprises the following steps: accepting user input 520, updating information in response to user input 522, providing an updated GUI 524. Each time the carrier or shipper opens the computer program comprises the following additional steps: verifying the credentials of the user 526, determining the first screen of the GUI to provide to the user 528. The secondary GUI is deployed in response to the message sent to the carrier or shipper so creating a login does not need to be performed.

The method of embodiments of the invention for creating new requests broadly comprises the following steps: accepting user input 530, saving the new request 532, creating new users 534, associating the new request with the users 536, and creating the message to send to the user 538. Because the shipper or carrier can address a request to a newly named carrier or shipper, respectively, this method performs the step of creating new users 534. The step of creating the message to send to the user 536 is performed for each user addressed to the new request. This step also embeds a link to a specific instance of the computer program. This link is passed to the logic of rendering the secondary GUI, alleviating the need for the user to login.

Operation and use of the system 10 will now be described in greater detail. For exemplar purposes, the system 10 is used by a soft drink bottler (herein "bottler"), a party supply manufacturer (herein "manufacturer"), an independent trucker (herein "trucker"), a well know package delivery service (herein "service"), and a large multinational freight handler (herein "handler"). The bottler and the manufacturer are both shippers, and the trucker and handler are carriers, respectively. The example begins on March 2nd, the bottler needs to ship 20 pallets of soft drinks from Austin, Texas to Atlanta, Georgia. on March 14th. The bottler creates a login and logs into the system 10 through the GUI 20. The GUI 20 displays the create shipment request screen 26 along with the plurality of help items 98. The bottler begins to type in information to the shipment request input 104 such as the origin, destination and pickup date. The origin input 106 autosuggests the city Austin based on the bottler typing "Au". The bottler selects the relevant information and finishes filling out the shipment request input 104. The bottler then enters the contact information for the service, and the handler in the carrier input 102. The bottler hits the create shipment request 126 interface element and is then taken to the shipment request list screen 22. The system also sends a message soliciting the service and the handler to respond with a bid.

The bottler leaves and logs back into the system a few hours later and the GUI 20 displays the shipment request list screen 22. The service and the handler have both responded and submitted bids. The shipment request list screen 22 displays the shipment request for the soft drinks to be sent from Austin to Atlanta on March 14th. The bids are displayed for both the service and the handler. The service has bid $3,000 and the handler has bid $2,850. The bottler clicks on the interaction element 44 for the shipment request and the GUI displays the shipment request detail screen 34. The shipment request detail screen 34 displays both the bid by the service and the bid by the handler. The handler's bid also states under his contact information "Cannot deliver until March 19th." Because the bottler believes he can obtain a cheaper quote that will deliver on time the bottler calls the trucker. The trucker's representative answers the phone and states that the trucker typically charges $2,400 for such a delivery. The bottler agrees and clicks the add carriers button 86 and enters the information of the trucker including the trucker's email and manually enters the bid. The system creates an email and sends it to the trucker with the details of the offer. The trucker agrees and the bottler clicks the bid/assign button 94 and assigns the shipment request to the trucker.

It is now March 10th and the bottler has been using the system for a while. Two days earlier he entered his next six shipment requests into the system as well as increased the number of carriers in his contacts to five. The bottler logs into the system and the computer program provides the GUI 20 that displays the shipment request list screen 22. The shipment request list screen 22 displays all seven shipment requests each with a bid summary that includes the origin and destination 46, the pickup date 48, as well as the carrier ids 54 of the carriers that have bid on the shipment request and their bid 56. The bottler is able to look at bids 56 from the various carriers and can tell when one of the carriers is charging a higher than market rate without leaving the shipment request list screen 22.

The trucker is also now using the system. The trucker has entered in the bottler and the manufacturer as well as other shippers who need items shipped. The trucker knowing he will be in Atlanta on the 15th after finishing the delivery for the bottler logs into the system on his tablet before going to sleep. The trucker creates a new cargo vehicle request stipulating that his 48-foot truck will be available for offers from shippers on the 15th of March. In the details input the trucker states that the truck will be in Atlanta and unloaded by 10 am. The trucker specifies that he will travel to Texas, Louisiana, Mississippi, Alabama, and Georgia. Upon creation of the cargo vehicle request the system sends a message to the shippers selected by the trucker including the manufacturer.

The manufacturer receives the message from the system. The manufacturer needs to ship some party hats to Memphis Tennessee before St. Patrick's day (March 17th) but has not found a carrier available. The manufacturer responds to the message and the system provides a second GUI 30 to the manufacturer with the details of the trucker's cargo vehicle request. The manufacturer can see that the trucker's cargo vehicle request does not state Tennessee on the list of states. The manufacturer decides to send a message to the trucker through the second GUI 30 and find out if the trucker would drive to Tennessee. The trucker wakes up on the March 11th and before doing his daily driving uses his tablet to log into the system. The computer program provides the GUI 20 that displays the cargo vehicle request list screen 22. The cargo vehicle request list screen 22 displays the cargo vehicle request created by the trucker with a new message icon next to the manufacturer's contact information. The trucker clicks the view detail button 44, reads that the manufacturer is offering him $1400 to drive six hours to Memphis. The trucker clicks the accept button 94 and logs out of the system. The system notifies the manufacturer that his party hats will be delivered.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for providing shipment information from a shipper to a carrier, the system comprising:

at least one processor;

a data store; and one or more non-transitory computer-readable media storing computer-executable instructions that, when executed by the at least one processor, perform a method of providing the shipment information from the shipper to the carrier, the method comprising:

causing display of a shipping graphical user interface (GUI) by a shipper server and to the shipper;

causing display of a shipment list of a plurality of shipments stored on a shipper database;

receiving a request by the shipper to generate a new shipment request for a new shipment;

causing display of a shipment request screen comprising a carrier list comprising a plurality of potential carriers including the carrier;

causing display of a carrier input field comprising a prompt to enter text indicative of the carrier from the carrier list of the plurality of potential carriers;

receiving, from the shipper, the text comprising a set of characters, wherein the set of characters match a plurality of carriers;

upon receiving a subset of the set of characters of the text from the shipper, removing the prompt to enter the text;

detecting a plurality of carrier indicia indicative of the plurality of carriers based on the subset of the text from the shipper;

matching the subset with carrier characters;

causing display of the plurality of carrier indicia indicative of the plurality of carriers, indicating each carrier indicia that includes the subset of the text by underlining, in real time, the subset of the text that matches each carrier indicia, wherein each carrier indicia of the plurality of carrier indicia are selectable by the shipper and, when a carrier indicium associated with the carrier is selected, the carrier input field is automatically updated with a communication field configured for communication with the carrier;

linking a communication protocol with the communication field;

receiving the shipment information indicative of a shipment;

sending a message comprising an embedded link to the carrier by the communication protocol, wherein the embedded link includes a web link to an instance of a carrier GUI; and upon selection of the embedded link, automatically authenticating the carrier by a carrier profile associated with the embedded link and providing the carrier GUI by a carrier server comprising the shipment information without the carrier logging into the carrier GUI.

2. The system of claim 1, wherein the method further comprises:

receiving, by the carrier GUI, a carrier bid from the carrier for the new shipment;

causing display of the carrier bid from the carrier for the new shipment by the shipping GUI;

receiving a further selection of the new shipment; and notifying, in real time and via the carrier GUI, the carrier associated with the carrier bid that the carrier bid is selected.

3. The system of claim 1, wherein the shipment information comprises origin, destination, required equipment, and shipper comments.

4. The system of claim 1, wherein the method further comprises causing display of a last message sent by the carrier to the shipper by a dialog box.

5. The system of claim 4, wherein the last message is one of a text message or an email message.

6. The system of claim 1, wherein the method further comprises causing display of a shipment summary including a map displaying a location destination for the new shipment.

7. The system of claim 1, wherein the method further comprises:

causing display of a bid list comprising of a plurality of new shipments, the plurality of new shipments including the new shipment;

requesting that the carrier bid the plurality of new shipments;

receiving, from the carrier by the carrier server, a further selection of the new shipment from the bid list;

receiving, from the carrier, bid details for the new shipment selected by the carrier; and notifying, in real time and via the shipping GUI, the shipper associated with the new shipment of the bid details.

8. One or more non-transitory computer-readable media storing computer-executable instructions that, when executed by at least one processor, perform a method of providing shipment information from a shipper to a carrier, the method comprising:

causing display of a shipping graphical user interface (GUI) by a shipper server and to the shipper;

causing display of a shipment list of a plurality of shipments stored on a shipper database;

receiving a request by the shipper to generate a new shipment request for a new shipment;

causing display of a shipment request screen comprising a carrier list comprising a plurality of potential carriers including the carrier;

causing display of a carrier input field comprising a prompt to enter text indicative of the carrier;

receiving, from the shipper, the text comprising a set of characters indicative of a plurality of carriers;

upon receiving a subset of the set of characters of the text from the shipper, removing the prompt to enter the text;

detecting a plurality of carrier indicia indicative of the plurality of carriers based on the subset of the text from the shipper;

matching the subset with carrier characters;

causing display of the plurality of carrier indicia indicative of the plurality of carriers;

indicating each carrier indicia that includes the subset of the text by underlining, in real time, the subset of the text that matches each carrier indicia, wherein each carrier indicia of the plurality of carrier indicia are selectable by the shipper and, when selected, the carrier input field is automatically updated with a communication indicia configured for communication with a respective carrier;

linking a communication protocol with each carrier indicia displayed in the carrier input field;

receiving the shipment information indicative of a shipment;

sending a message comprising an embedded link to each carrier of the plurality of carriers by the communication protocol, each embedded link directing each carrier to an instance of a carrier GUI; and upon selection of the embedded link by the carrier, automatically authenticating the carrier by a carrier profile associated with the embedded link and providing the carrier GUI by a carrier server comprising the shipment information to the carrier without the carrier logging into the carrier GUI.

9. The media of claim 8, wherein the message further comprises a carrier bid request requesting a bid on the new shipment.

10. The media of claim 8, wherein the method further comprises causing display of a shipment summary including a map displaying a location destination for the new shipment.

11. The media of claim 10, wherein the method further comprises automatically sending the message to the plurality of carriers requesting a bid on the new shipment.

12. The media of claim 11, wherein the message is one of an email or an SMS message.

13. The media of claim 12, wherein the method further comprises receiving, by the carrier GUI, bid details of the new shipment.

14. The media of claim 13, wherein the bid details include a monetary value representing an amount of money the carrier is willing to accept for carrying the new shipment.

15. A method of providing shipment information from a shipper to a carrier, the method comprising:

causing display of a shipping graphical user interface (GUI) by a shipper server and to the shipper;

causing display of a shipment list of a plurality of shipments stored on a shipper database;

receiving a request by the shipper to generate a new shipment request for a new shipment;

causing display of a shipment request screen comprising a carrier list comprising a plurality of potential carriers including the carrier;

causing display of a carrier input field comprising a prompt to enter text indicative of the carrier;

receiving, from the shipper, the text comprising a set of characters, wherein the set of characters match a plurality of carriers;

upon receiving a subset of the set of characters of the text from the shipper, removing the prompt to enter the text;

detecting a plurality of carrier indicia indicative of the plurality of carriers based on the subset of the text from the shipper;

matching the subset with carrier characters;

causing display of the plurality of carrier indicia indicative of the plurality of carriers, indicating each carrier indicia that includes the subset of the text by underlining, in real time, the subset of the text that matches each carrier indicia, wherein each carrier indicia of the plurality of carrier indicia are selectable by the shipper and, when selected, the carrier input field is automatically updated with a communication indicia configured for communication with a respective carrier;

linking a communication protocol with each carrier indicia displayed in the carrier input field;

receiving the shipment information indicative of a shipment;

sending a message comprising an embedded link to each carrier of the plurality of carriers including the carrier by the communication protocol, each embedded link directing each carrier to an instance of a carrier GUI; and upon selection of the embedded link by the carrier, automatically authenticating the carrier by a carrier profile associated with the embedded link and providing a carrier GUI by a carrier server comprising the shipment information without the carrier logging into the carrier GUI.

16. The method of claim 15, further comprising:

automatically sending the message to the plurality of carriers requesting a bid on the shipment and including shipment details; and receiving a carrier bid from the carrier including bid details requested by the carrier.

17. The method of claim 16, wherein the bid details include a monetary value representing an amount of money the carrier is willing to accept for carrying the shipment.

18. The method of claim 16, wherein the shipment details associated with the shipment are one or more of origin, destination, required equipment, or comments.

19. The method of claim 15, further comprising causing display of a shipment summary including a map displaying a location destination for the new shipment.

20. The method of claim 15, further comprising:

displaying a last dialog message sent by the carrier to the shipper by a dialog box, wherein the last dialog message is one of a text message or an email message.

* * * * *